(12) United States Patent  
Kataoka et al.

(10) Patent No.: US 7,205,406 B2
(45) Date of Patent: Apr. 17, 2007

(54) AZOMETHINE DYE AND METAL COMPLEX DYE, AS WELL AS COLOR TONER AND INK-JET INK USING THE SAME

(75) Inventors: Emiko Kataoka, Hino (JP); Takatugu Suzuki, Hachioji (JP); Dai Ikemizu, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 11 days.

(21) Appl. No.: 11/173,538

(22) Filed: Jul. 1, 2005

(65) Prior Publication Data

US 2006/0073403 A1    Apr. 6, 2006

(30) Foreign Application Priority Data

Jul. 5, 2004   (JP) .............................. 2004-197837
Jul. 1, 2005   (JP) .............................. 2005-193702

(51) Int. Cl.
  *C09B 55/00* (2006.01)
  *C09D 11/00* (2006.01)
  *G03G 9/09* (2006.01)

(52) U.S. Cl. .................... 544/405; 546/2; 546/167; 546/256; 546/272.4; 546/273.1; 548/108; 548/181; 548/262.4; 548/303.1; 106/31.47; 106/31.49; 430/108.21

(58) Field of Classification Search ............... 544/405; 546/2, 167, 256, 272.4, 273.1; 548/108, 548/181, 262.4, 303.1; 106/31.47, 31.49; 430/108.21

See application file for complete search history.

(56) References Cited

U.S. PATENT DOCUMENTS

| | | | | |
|---|---|---|---|---|
| 4,921,968 | A | * | 5/1990 | Yokoyama et al. ...... 548/262.4 |
| 5,210,200 | A | * | 5/1993 | Shimada et al. ......... 548/303.1 |
| 5,476,943 | A | * | 12/1995 | Komamura et al. ..... 546/272.4 |
| 5,753,017 | A | * | 5/1998 | Onodera et al. ......... 106/31.49 |
| 5,814,580 | A | * | 9/1998 | Onishi et al. .............. 503/227 |
| 5,916,721 | A | * | 6/1999 | Soeda et al. .............. 430/108.2 |
| 6,800,123 | B2 | * | 10/2004 | Arakawa ................. 106/31.25 |

FOREIGN PATENT DOCUMENTS

| | | |
|---|---|---|
| JP | 07-166084 A | 6/1995 |
| JP | 09-143382 A | 6/1997 |
| JP | 10-36728 * | 2/1998 |
| JP | 10-264541 A | 10/1998 |
| JP | 11-99745 * | 4/1999 |
| JP | 2001-31896 A | 2/2001 |

* cited by examiner

*Primary Examiner*—Fiona T. Powers
(74) *Attorney, Agent, or Firm*—Frishauf, Holtz, Goodman & Chick, P.C.

(57) ABSTRACT

An azomethine dye represented by the following Formula 1:

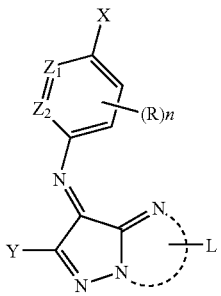

Formula 1 wherein Y represents a substituent of $0.2 \leq \sigma p \leq 0.9$, $Z_1$ and $Z_2$ each represent $-CR_1=$, where $R_1$ represents a hydrogen atom or a substituent, or $-N=$, L represents the group represented by the following Formula 1a, X represents an unsubstituted or substituted di-alkylamino group, R represents an unsubstituted or substituted alkyl group, and n represents an integer more than 0.

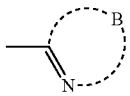

Formula 1a wherein B represents a group of non-metallic atoms which are necessary to form a heterocyclic ring.

13 Claims, No Drawings

AZOMETHINE DYE AND METAL COMPLEX DYE, AS WELL AS COLOR TONER AND INK-JET INK USING THE SAME

FIELD OF THE INVENTION

The present invention relates to azomethine dyes and metal complex dyes, as well as color toners and ink-jet inks using the same.

BACKGROUND OF THE INVENTION

Colorants known as dyes or pigments are widely used as fiber dying materials, resin and paint coloring materials, image forming materials in photography, printing, copiers, and printers, as well as light absorbing materials in color filters. In recent years, proposed have been various hard copy image forming dyes employed for ink-jet printing, electrophotography, silver salt photography, and thermal transfer applications. Further, along with the progress of electronic imaging, increased has the demand for filter dyes for solid state image pick-up tubes and color liquid crystal display, as well as dyes for optical recording media utilizing semiconductor lasers, whereby dye application fields have been widened. The common qualities required for the above dyes are listed below.

Namely, listed are preferable hues for color reproduction, optimal spectral absorption characteristics, sufficient image resistance to such as light, heat, moisture, and chemicals, as well as sufficiently high molar absorption coefficients.

Heretofore, azomethine dyes have been employed as an image forming dye for silver halide photosensitive color photographic materials utilizing the subtractive color process based on the three-color mixture of yellow, magenta, and cyan. These dyes are disclosed and proposed as color hard copy image forming dyes (refer, for example, to Patent Documents 1–6). However, desired image durability of these dyes has not yet been achieved. Further, metal complex dyes exhibiting good lightfastness are described (refer, for example, to Patent Documents 7–9). However, they are disadvantageous for the use as image forming dyes due to low molar absorption coefficient as well as specific absorption wavelengths. Subsequently, it is still desired to develop dyes providing the aforesaid qualities.

In color copiers and color laser printers utilizing electrophotographic systems, commonly employed are toners in which colorants are dispersed into resinous particles, or colorants are adsorbed onto the surface of resinous particles. Listed as performance characteristics demanded for color toners are absorption capable of realizing preferable color reproduction regions, especially high light transmittance (transparency) when used in overhead projectors (hereinafter referred to as OHP) and various kinds of durability under ambient conditions during use.

Japanese Patent Publication Open to Public Inspection (hereinafter referred to as JP-A) Nos. 62-157051 and 6-118715 disclose toners in which pigments as a colorant are dispersed into particles. The resulting toners exhibit the desired lightfastness. However, since they tend to coagulate due to insolubility, a decrease in transparency and hue variation of transmitted light become a problem. On the other hand, each of JP-A Nos. 2-207274, 2-207273, 3-276161, 7-209912, 8-123085, and 2002-371214 discloses toners in which dyes are employed as a colorant. The resulting toners exhibit high transparency and no variation of color hue, but insufficient lightfastness.

The following characteristics are demanded for dyes employed for ink-jet recording inks: Highly soluble in solvents, possibility of high density recording, preferable color hues, high durability against light, heat, air, water and chemicals, desired fixability and minimal penetration onto image receiving materials, high storage stability in the form of ink, no toxicity, and high purity, as well as lower cost. However, it is very difficult to find dyes which satisfy these demands at the desired high level. Specifically, increasingly demanded are dyes which exhibit desired hues and excellent lightfastness.

JP-A Nos. 61-36362 and 2-212566 disclose ink-jet recording inks which are aimed at the compatibility of color hues and lightfastness. However, in cases in which dyes employed in each patent are employed as a water-soluble ink, solubility in water is insufficient.

(Patent Document 1) pages 7–9 of JP-A No. 59-184339
(Patent Document 2) pages 10–13 of JP-A No. 63-145281
(Patent Document 3) pages 3–4 of JP-A No. 2-3450
(Patent Document 4) JP-A No. 4-359968
(Patent Document 5) JP-A No. 7-166084
(Patent Document 6) JP-A No. 10-264541
(Patent Document 7) JP-A No. 2-76884
(Patent Document 8) JP-A No. 9-131973
(Patent Document 9) JP-A No. 9-143382

DETAILED DESCRIPTION OF THE INVENTION

An objective of the present invention is to provide an azomethine dye and a metal complex dye which exhibit sharp absorption and a high molar absorption coefficient, and result in excellent durability against radiation, heat and moisture, and further provide a color toner which forms images exhibiting excellent hue and lightfastness, as well as an ink-jet ink which forms images exhibiting excellent color tone, employing the aforesaid dye.

According to the present invention, it is possible to provide azomethine dyes and metal complex dyes which exhibit sharp absorption and high molar absorption coefficients and result in excellent durability against radiation, heat, and moisture, and further provide color toners which form images exhibiting excellent hue and light fastness as well as ink-jet inks exhibiting excellent color tone, employing the above dyes.

The present invention will now be detailed.

As used herein, σp represents an electronic parameter which can be calculated based on the method described in J. Med. Chem. 16, 1207 (1973) as well as J. Med. Chem. 20, 304 (1977).

In the Formulas 1–8, Y represents a substituent having a σp commonly in the range of $0.2 \leq \sigma p \leq 0.9$, preferably $0.3 \leq \sigma p \leq 0.8$, but more preferably $0.4 \leq \sigma p \leq 0.7$. Cases of σp<0.2 are not preferred because the absorption wavelength range becomes too wide, while cases of σp>0.9 are also not preferred because the yield of a dye reaction is deteriorated. Preferred as a specific substituent are an acyl group, an alkoxycarbonyl group, an aryloxycarbonyl group, a carbamoyl group, an alkylsulfonyl group, an arylsulfonyl group, a sulfamoyl group, a cyano group, or a perfluoroalkyl group.

In the Formula 1, L represent the group represented by the Formula 1a. The groups represented by the Formula 1a include a 2-pyrrolyl group, an imidazolyl group, an isothiazolyl group, an isooxazolyl group, a 3-pyrazolyl group, a pyrazinyl group, a triazolyl group, a 2-pyridyl group, a pyridazinyl group, a pyrimidinyl group, a 3H-indolyl group, a 1H-indazolyl group, a purinyl group, an isoquinolyl group, a quinolyl group, a phthalazinyl group, a naphthylidinyl group, and a quinazolyl group. These heterocycles may have a substituent, which may include, for example, a halogen atom (e.g., a fluorine atom and a chlorine atom), an alkyl group (e.g., an methyl group, an ethyl group, a butyl group, a pentyl group, a 2-methoxyethyl group, a trifluoromethyl group, and a 2-ethylhexyl group), an aryl group (e.g., a phenyl group, a p-tolyl group, and a naphthyl group), an acyl group (e.g., an acetyl group, a propionyl group, and a benzoyl group), an alkoxy group (e.g., a methoxy group, an ethoxy group, and a butoxy group), an alkoxycarbonyl group (e.g., a methoxycarbonyl group and an i-propoxycarbonyl group), an acyloxy group (e.g., an acetyloxy group and an ethylcarbonyloxy group), an alkylthio group (e.g., a methylthio group, an ethylthio group, and an octylthio group), an arylthio group (e.g., a phenylthio group and a p-tolylthio group), an amino group (e.g., a methylamino group, a diethylamino group, and a methoxyethylamino group), a cyano group, and a nitro group, a heterocyclyl group (e.g., a pyridyl group, a pyrazolyl group, an imidazolyl group, a furyl group, and a thienyl group).

R represents an unsubstituted or substituted alkyl group (e.g., a methyl group, an ethyl group, a propyl group, a methoxyethyl group, and a hydroxymethyl group).

X represents an unsubstituted or substituted di-alkylamino group in which substituent include an aryl group (e.g., a phenyl group, a p-tolyl group, and a naphthyl group), an acyl group (e.g., an acetyl group, a propionyl group, and a benzoyl group), an alkoxy group (e.g., a methoxy group, an ethoxy group, and a butoxy group), an alkoxycarbonyl group (e.g., a methoxycarbonyl group and an i-propoxycarbonyl group), an acyloxy group (e.g., an acetyloxy group and an ethylcarbonyloxy group), an alkylthio group (e.g., a methylthio group, an ethylthio group, and an octylthio group), an arylthio group (e.g., a phenylthio group and a p-tolylthio group), an amino group (e.g., a methylamino group, a diethylamino group, and a methoxyethylamino group), a cyano group, a nitro group, a hydroxyl group, a carboxyl group, a sulfonic acid group, a sulfonamide group (e.g., methylsulfonamide group, ethylsulfoneamide group), an acylamino group (e.g., an acetylamino group, and a benzoylamino group), a carbamoyl group (e.g., a methyl carbamoyl group, and a phenylcarbamoyl group), a sulfamoyl group (e.g., a methylsulfamoyl group, and a phenylsulfamoyl group). $R_1$ represents a hydrogen atom or a substituent which include an alkyl group (e.g., a methyl group, an ethyl group, a butyl group, a pentyl group, a 2-methoxyethyl group, a trifluoromethyl group, and a 2-ethylhexyl group), an acyl group (e.g., an acetyl group, a propionyl group, and a benzoyl group), an alkoxy group (e.g., a methoxy group, an ethoxy group, and a butoxy group), an alkoxycarbonyl group (e.g., a methoxycarbonyl group and an i-propoxycarbonyl group), an acyloxy group (e.g., an acetyloxy group and an ethylcarbonyloxy group), an alkylthio group (e.g., a methylthio group, an ethylthio group, and an octylthio group), an arylthio group (e.g., a phenylthio group and a p-tolylthio group), an amino group (e.g., a methylamino group and a diethylamino group), a cyano group, and a nitro group.

Listed as groups represented by the Formula 1b are a pyrazinyl group, a 2-pyridyl group, a pyridazinyl group, and a pyrimidinyl group. Listed as $R_{3a}$ are a halogen atom (e.g., a fluorine atom and a chlorine atom), an alkyl group (e.g., a methyl group, an ethyl group, a butyl group, a pentyl group, a 2-methoxyethyl group, a trifluoromethyl group, and a 2-ethylhexyl group), an aryl group (e.g., a phenyl group, a p-tolyl group, and a naphthyl group), an acyl group (e.g., an acetyl group, a propionyl group, and a benzoyl group), an alkoxy group (e.g., a methoxy group, an ethoxy group, and a butoxy group), an alkoxycarbonyl group (e.g., a methoxycarbonyl group and an i-propoxycarbonyl group), an acyloxy group (e.g., an acetyloxy group and an ethylcarbonyloxy group), an alkylthio group (e.g., a methylthio group, an ethylthio group, and an octyl group), an arylthio group (e.g., a phenylthio group and a p-tolylthio group), an amino group (e.g., a methylamino group, a diethylamino group, and a methoxyethylamino group), a cyano group, a nitro group, a heterocyclyl group (e.g., a pyridyl group, a pyrazolyl group, an imidazolyl group, a furyl group, and a thienyl group).

Listed as the groups represented by the Formula 1c are a 2-pyrrolyl group, an imidazolyl group, an isothiazolyl group, an isooxazolyl group, a 3-pyrazolyl group, a triazolyl group, while listed as $R_{3b}$ are a halogen atom (e.g., a fluorine atom and a chlorine atom), an alkyl group (e.g., an methyl group, an ethyl group, a butyl group, a pentyl group, a 2-methoxyethyl group, a trifluoromethyl group, and a 2-ethylhexyl group), an aryl group (e.g., a phenyl group, a p-tolyl group, and a naphthyl group), an acyl group (e.g., an acetyl group, a propionyl group, and a benzoyl group), an alkoxy group (e.g., a methoxy group, an ethoxy group, and a butoxy group), an alkoxycarbonyl group (e.g., a methoxycarbonyl group and an i-propoxycarbonyl group), an acyloxy group (e.g., an acetyloxy group and an ethylcarbonyloxy group), an alkylthio group (e.g., a methylthio group, an ethylthio group, and an octylthio group), an arylthio group (e.g., a phenylthio group and a p-tolylthio group), an amino group (e.g., a methylamino group, a diethylamino group, and a methoxyethylamino group), a cyano group, a nitro group, a heterocyclyl group (e.g., a pyridyl group, a pyrazolyl group, an imidazolyl group, a furyl group, and a thienyl group).

In the metal complex dyes represented by the Formulas 5–8, selected as the metals represented by M are those from metals in Groups VIII, Ib, IIb, IIIa, IVa, Va, VIa, and VIIa. Of these, preferred are divalent transition metals. Specifically listed are divalent metals which include Ni, Cu, Co, Cr, Zn, Fe, Pd, and Pt. Preferably listed are Ni, Cu, Co, Cr, and Zn. Of these, particularly preferred is Ni.

Further, of metal salts, listed as inorganic metal salts may, for example, be perchlorates, halides, sulfates, boron fluorides, strontium fluorides, and hexafluorophosphates. Listed as organic metal salts or metal complexes may be those which are organic groups capable of neutralizing metal ions. Listed as examples may be fatty acids, aromatic carboxylic acids, alkylsulfonic acids, arylsulfonic acids, phenols, acetylacetones, dithiocaroxylic acids, and teraphenylboron.

In the Formulas 2–4, Ra and Rb each represent the group represented by the Formula 1a. Rc and Rd each represent the group represented by the Formula 1a or a univalent organic group, and at least one of Rc and Rd represents the group represented by the Formula 1a. Listed as univalent organic groups are, for example, a halogen atom (e.g., a fluorine atom and a chlorine atom), an alkyl group (e.g., a methyl group, an ethyl group, a butyl group, a pentyl group, a 2-methoxyethyl group, a trifluoromethyl group, and a 2-ethylhexyl group), an aryl group (e.g., a phenyl group, a p-tolyl group, and a naphthyl group), an acyl group (e.g., an acetyl group, a propionyl group, and a benzoyl group), an alkoxy group (e.g., a methoxy group, an ethoxy group, and a butoxy group), an alkoxycarbonyl group (e.g., a methoxycarbonyl group and an i-propoxycarbonyl group), an acyloxy group (e.g., an acetyloxy group and an ethylcarbonyloxy group), a carbamoyl group (e.g., a methyl carbamoyl group, an ethylcarbamoyl group, a butylcarbamoyl group, and a phenylcarbamoyl group), a sulfamoyl group (e.g., a sulfamoyl group, a methylsulfamoyl group, a dimethylsulfamoyl group, and a phenylsulfamoyl group), an alkylthio group (e.g., a methylthio group, an ethylthio group, and an octyl group), an arylthio group (e.g., a phenylthio group and a p-tolylthio group), an amino group (e.g., an amino group, a methylamino group, a diethylamino group, and a methoxyethylamino group), an acylamino group (e.g., an acetylamino group, a chloroacetylamino group, a propionylamino group, a benzoylamino group, and a trifluoroacetyl amino group), an alkylureido group (e.g., a methylureido group, an ethylureido group, a methoxyethylureido group, and a dimethylureido group), an arylureido group (e.g., a phenylureido group), an alkylsulfonamido group (e.g., a methanesulfonamido group, an wthanesulfonamido group, a butanesulfonamido group, a trifluoromethylsulfonamido group, and 2,2,2-trifluoroethylsulfonamido group), an arylsulfonamido group (e.g., a phenylsulfonamido gepup and a tolylsulfonamido group), an alkylaminosulfonylamino group (e.g., a methylaminosulfonylamino group and an ethylaminosulfonylamino group), an arylaminosulfonylamino group (e.g., a phenylaminosulfonylamino group), a hydroxy group, a cyano group, a nitro group, a heterocyclyl group (e.g., a pyridyl group, a pyrazolyl group, and imidazolyl group, a furyl group, and a thienyl group).

The metal complex dyes of the present invention are the complex of the dyes represented by the Formulas 1–4 and metal ions. In the above metal complex dyes, it is preferable that the dye used as a ligand possesses at least two coordinating positions and both coordinating positions are nitrogen atoms. Specifically, metal complex dyes of the dyes represented by the Formula 5–8 are preferably employed. Specific example of representative azomethine dyes and metal complex dyes of the present invention will now be listed below, however, the present invention is not limited thereto.

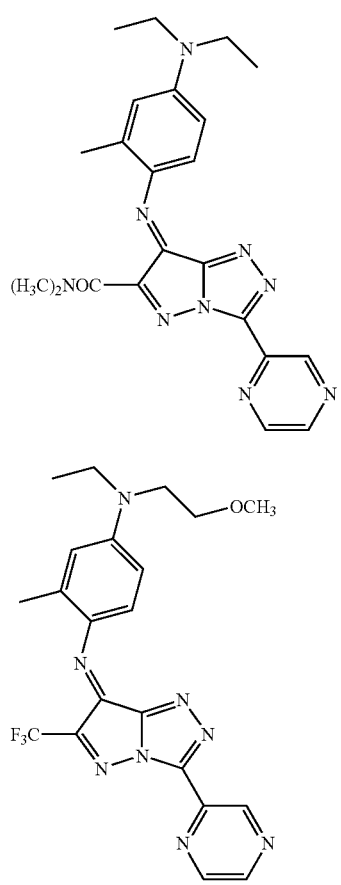

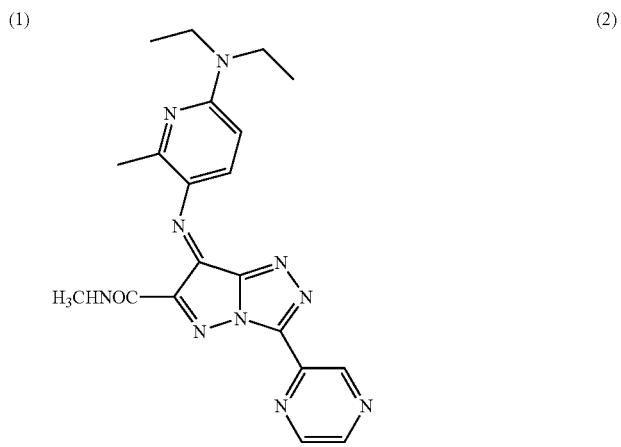

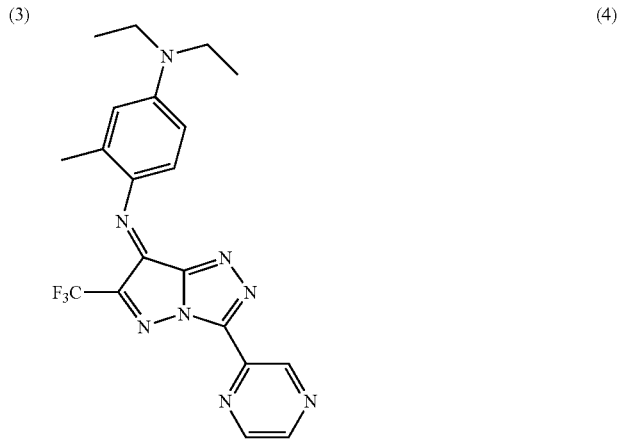

-continued
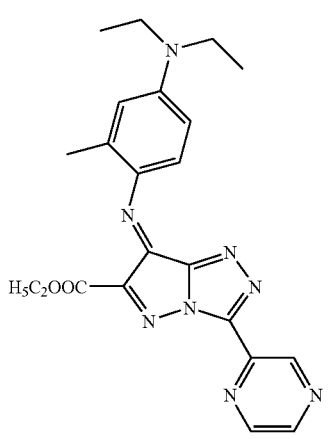
(5)
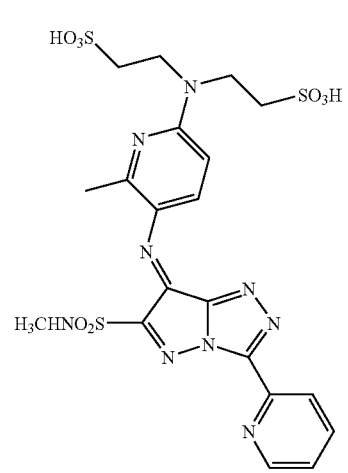
(6)
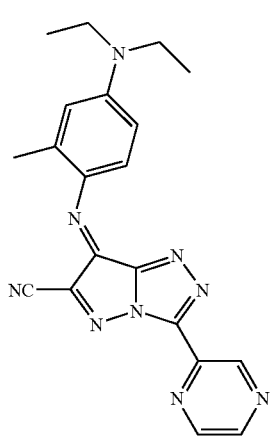
(7)
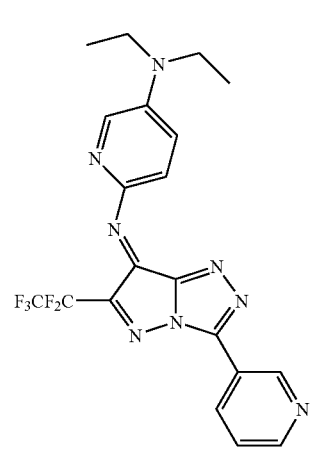
(8)
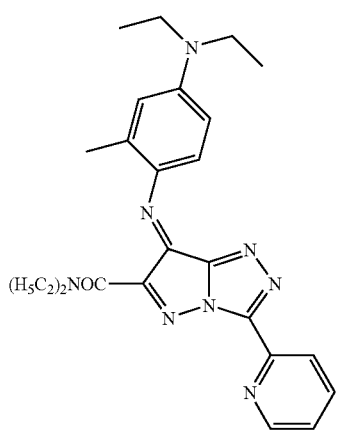
(9)
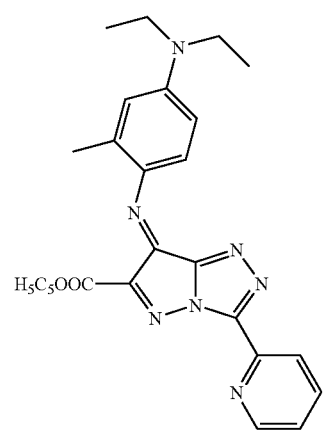
(10)

-continued
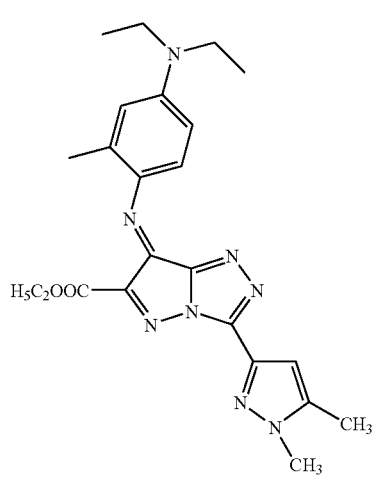
(11)
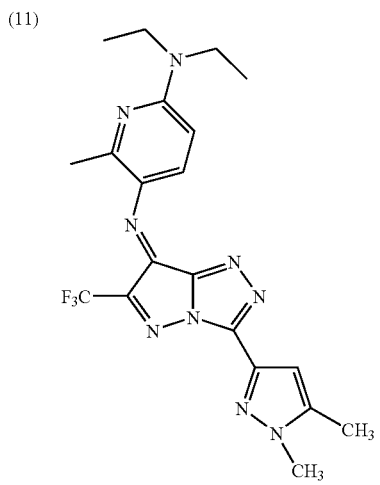
(12)
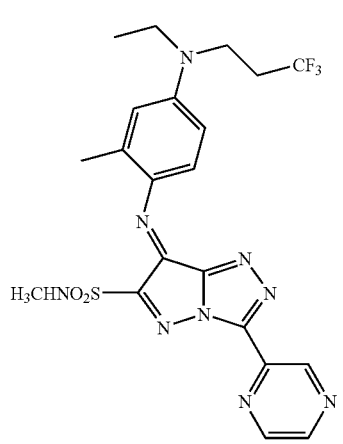
(13)
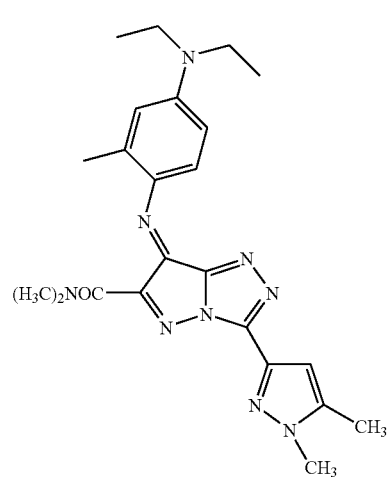
(14)
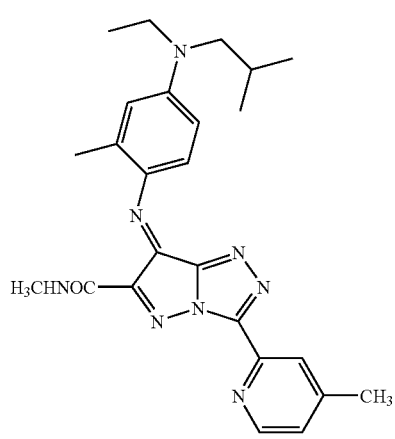
(15)
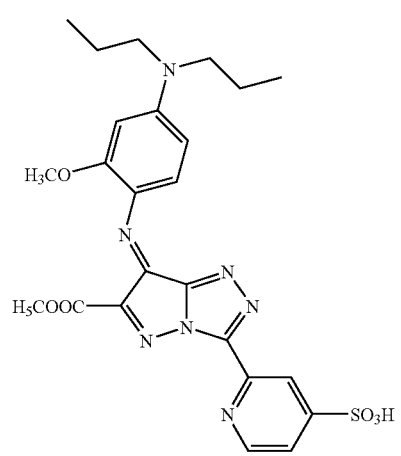
(16)

-continued
(17)
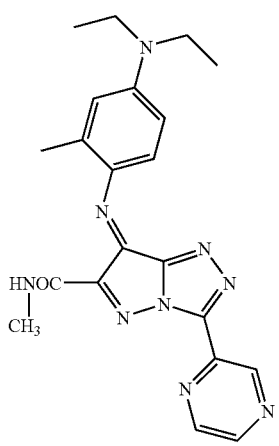
(18)
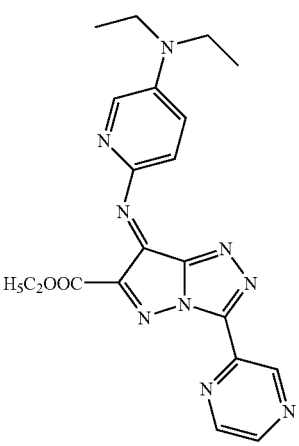
(19)
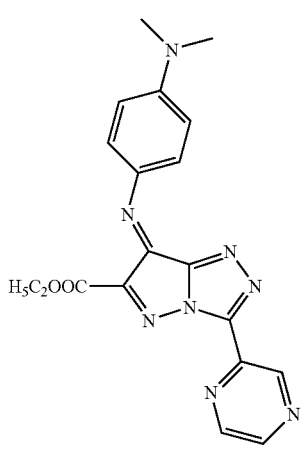
(20)
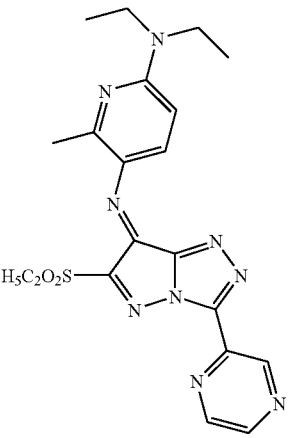
(21)
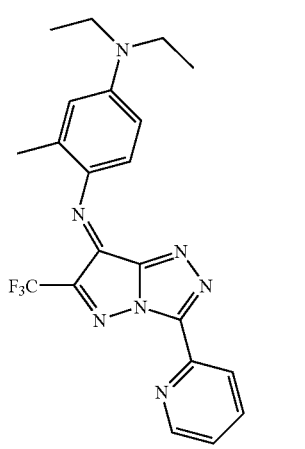
(22)
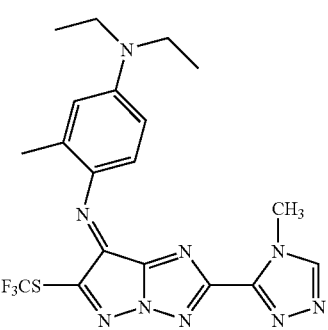
(23)
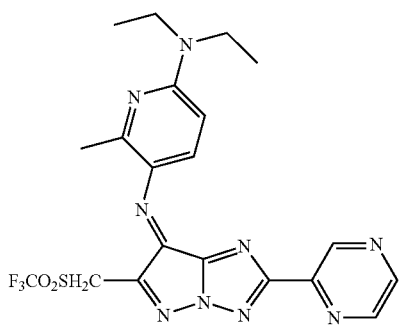
(24)
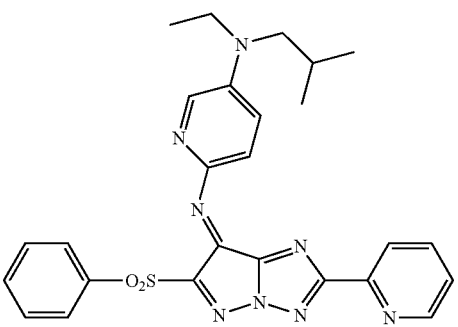

-continued
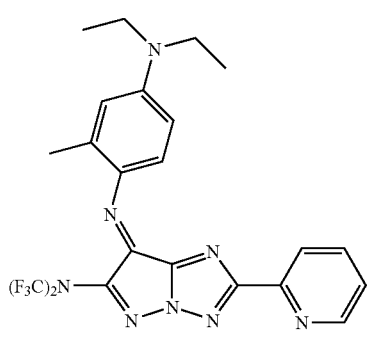
(25)
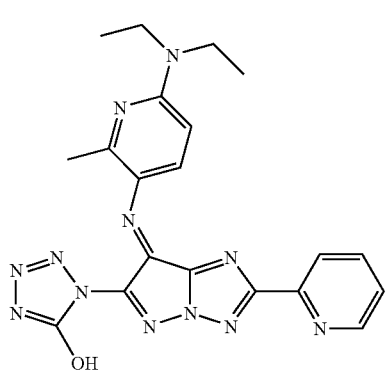
(26)
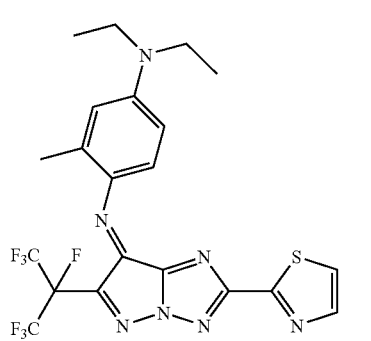
(27)
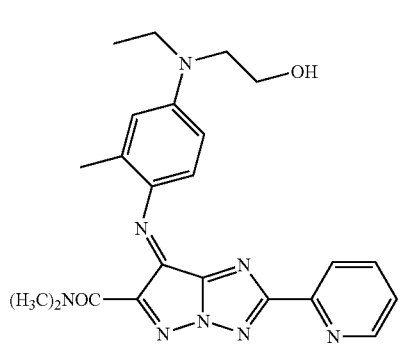
(28)
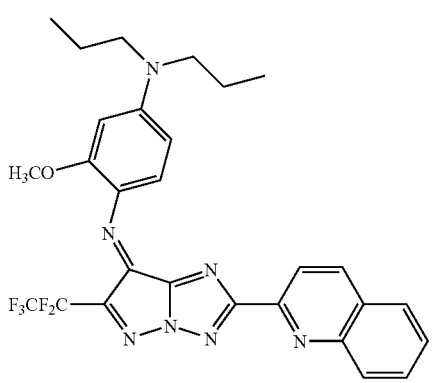
(29)
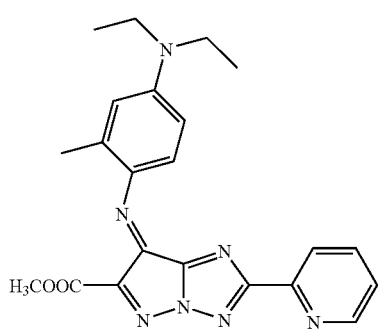
(30)
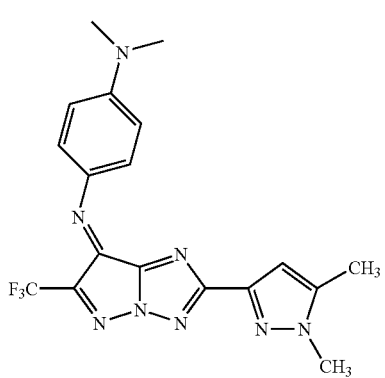
(31)
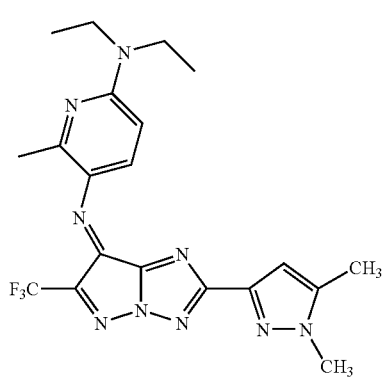
(32)

-continued
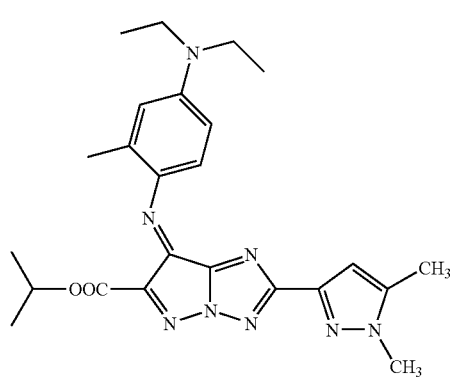
(33)
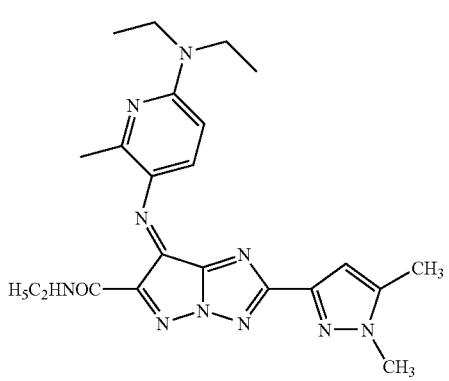
(34)
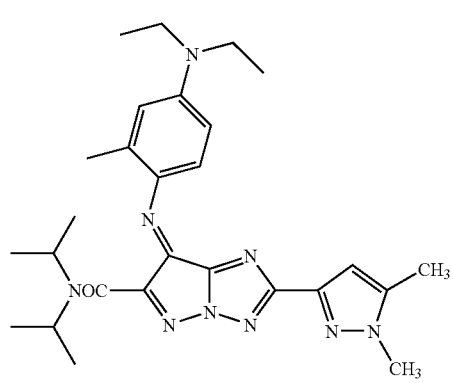
(35)
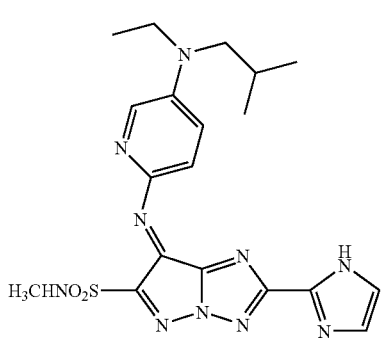
(36)
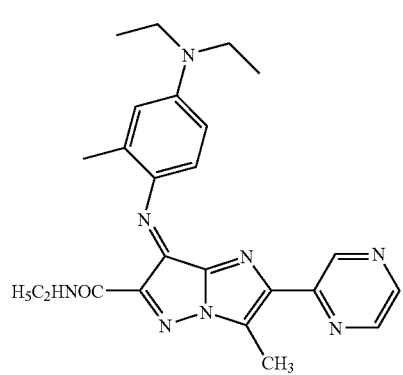
(37)
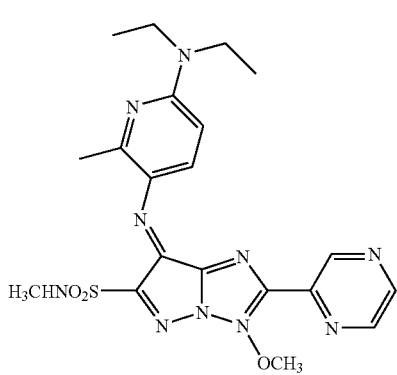
(38)
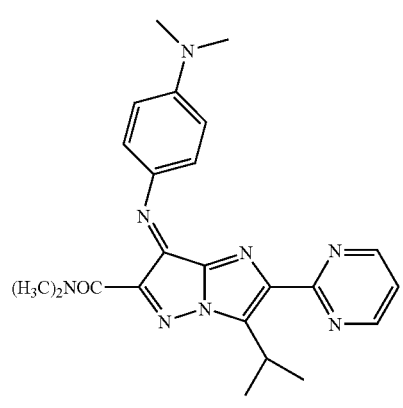
(39)
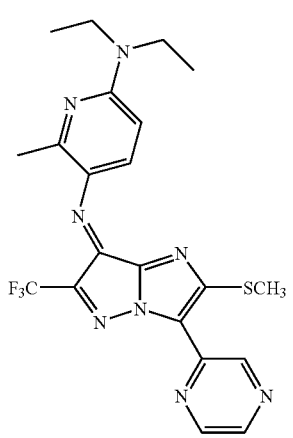
(40)

-continued
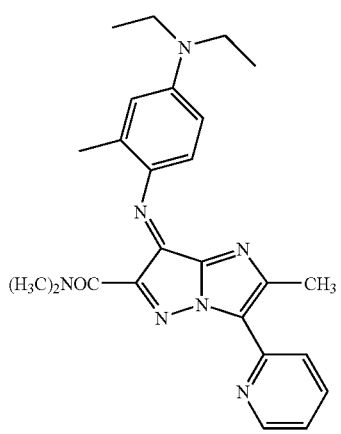
(41)
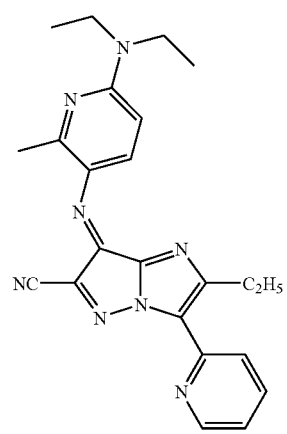
(42)
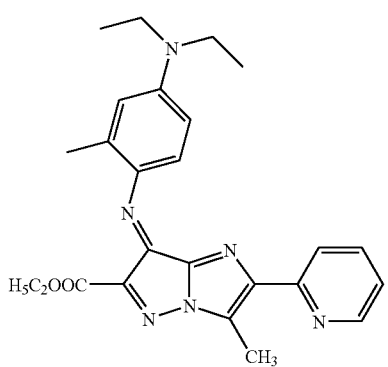
(43)
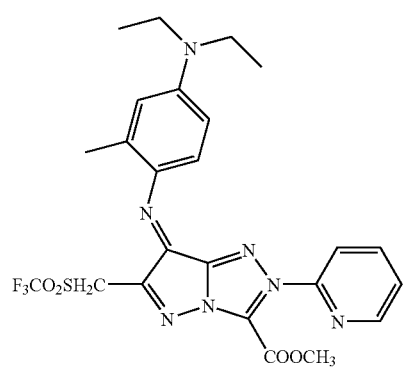
(44)
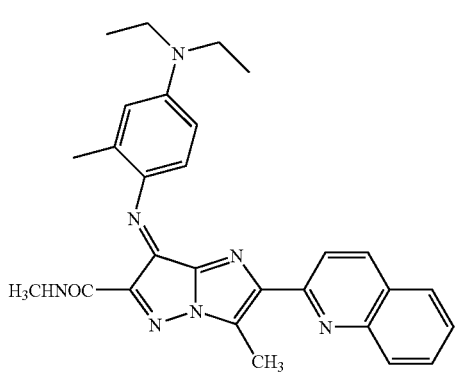
(45)
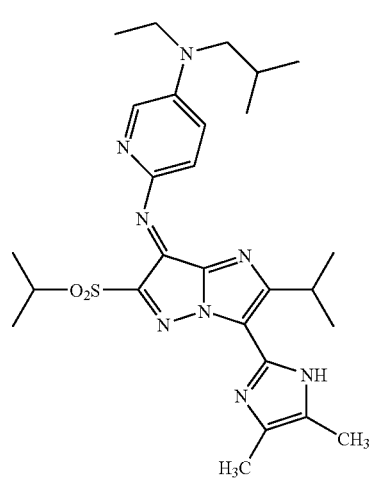
(46)

-continued
(47)
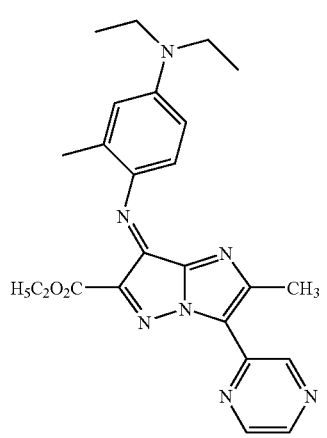
(48)
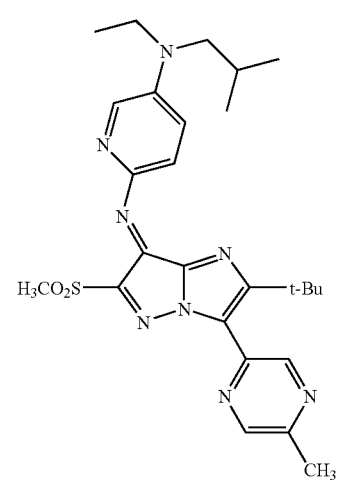
(49)
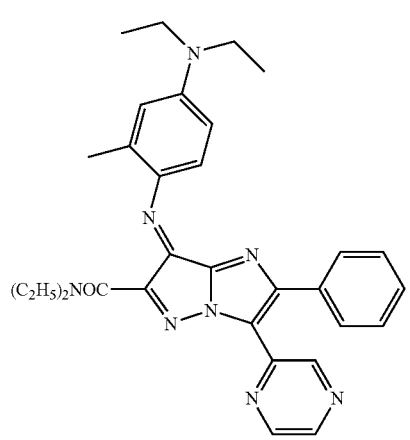
(50)
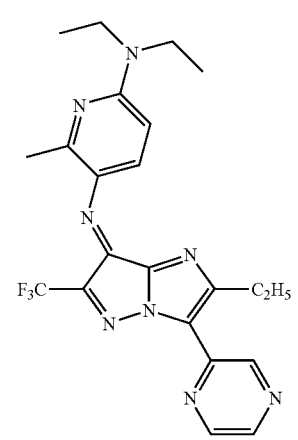
(51)
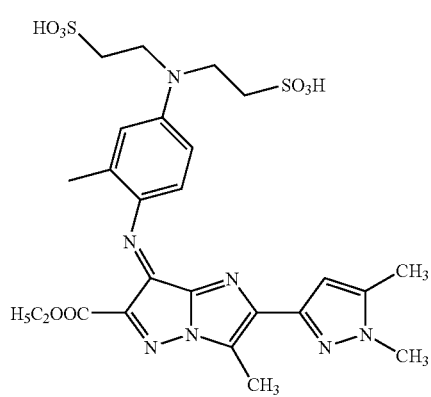
(52)
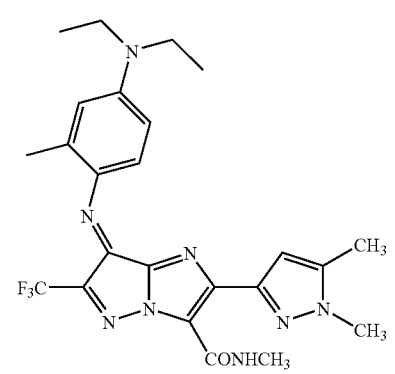

-continued
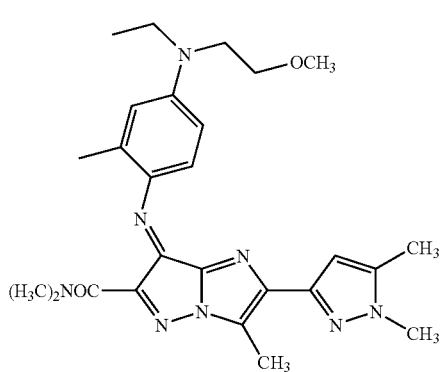
(53)
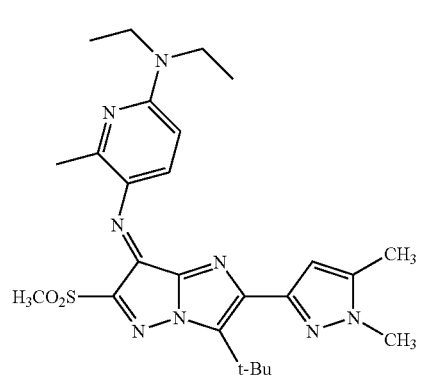
(54)
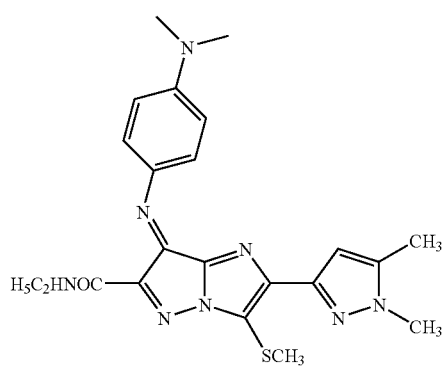
(55)
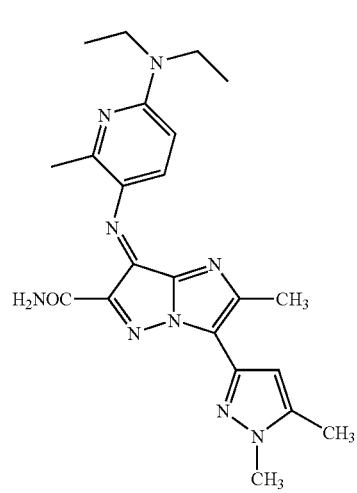
(56)
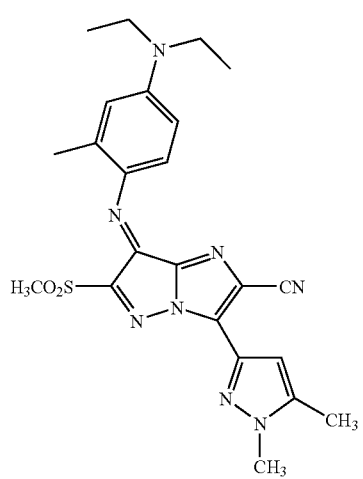
(57)
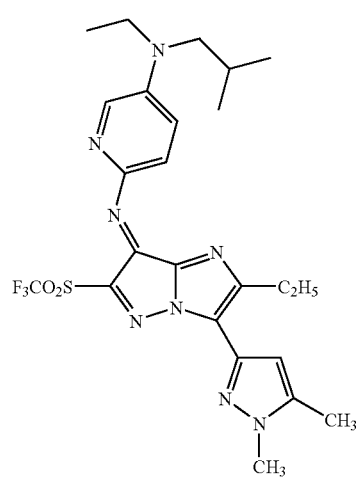
(58)

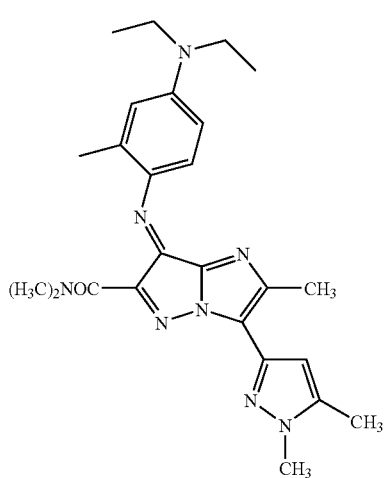
(59)
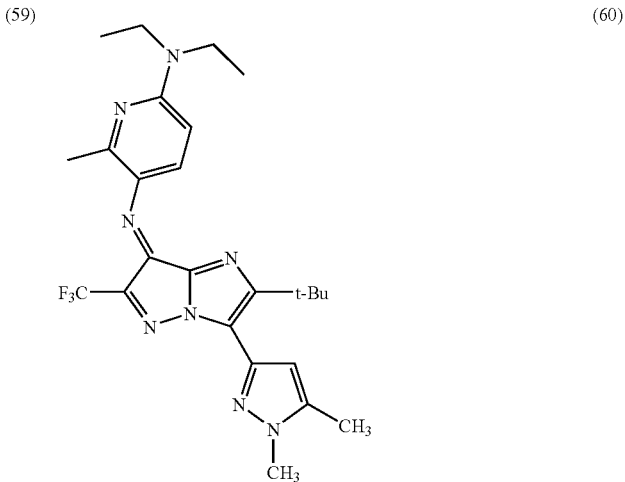
(60)
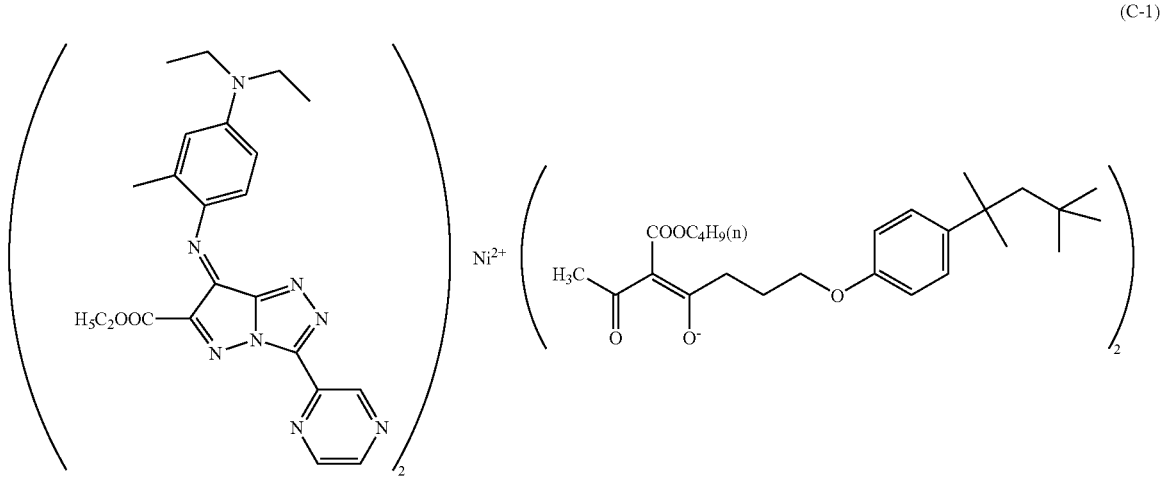
(C-1)
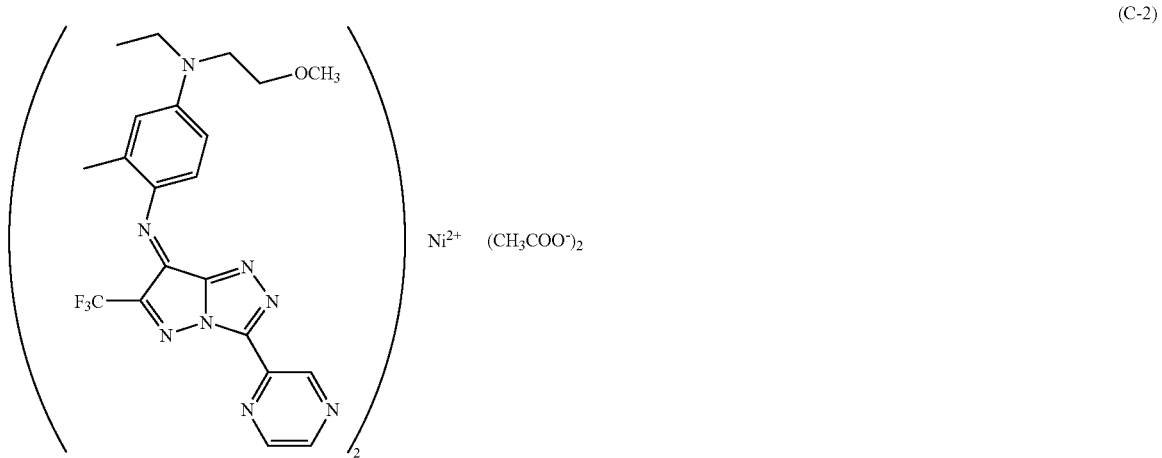
(C-2)

-continued
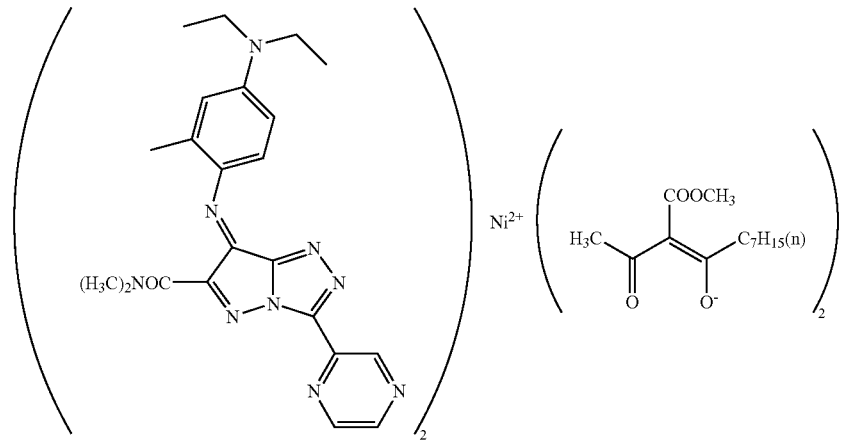
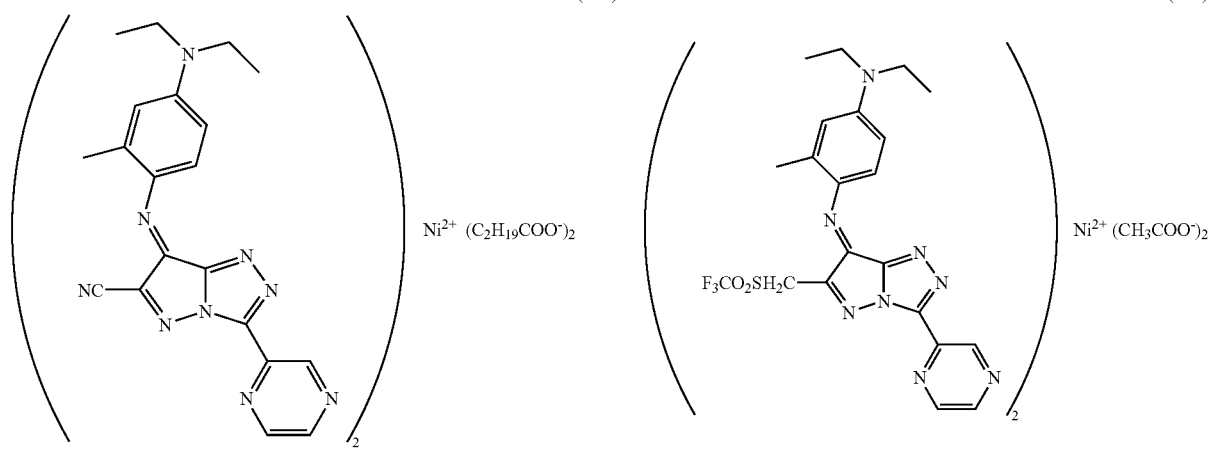
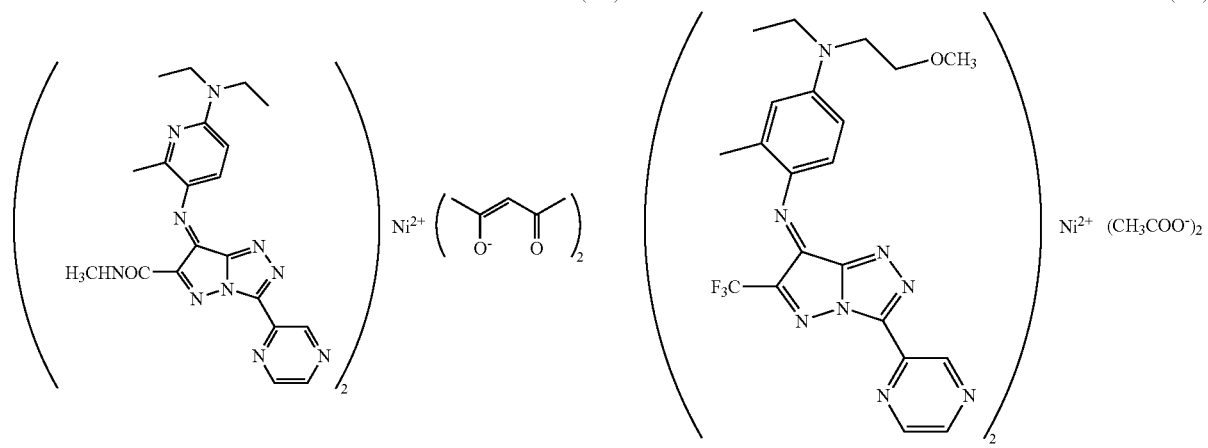

(C-8)
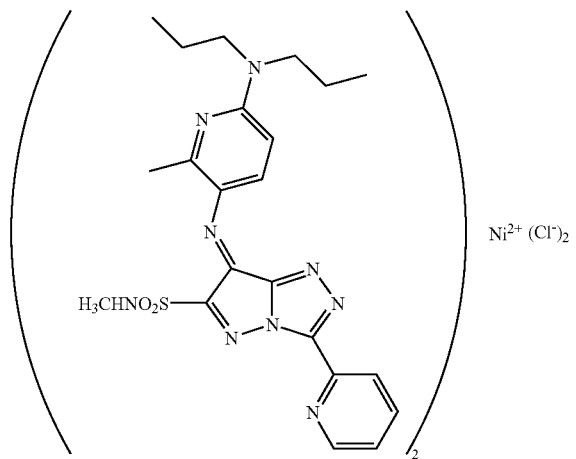
(C-9)
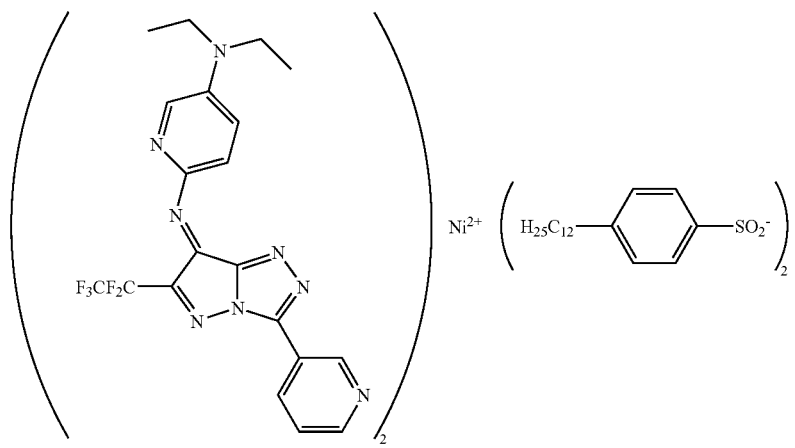
(C-10)
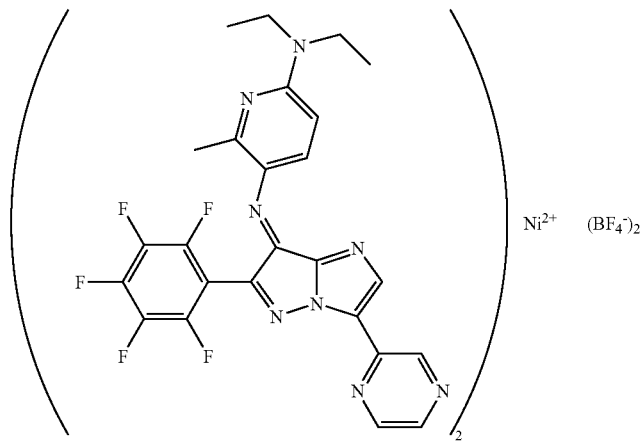

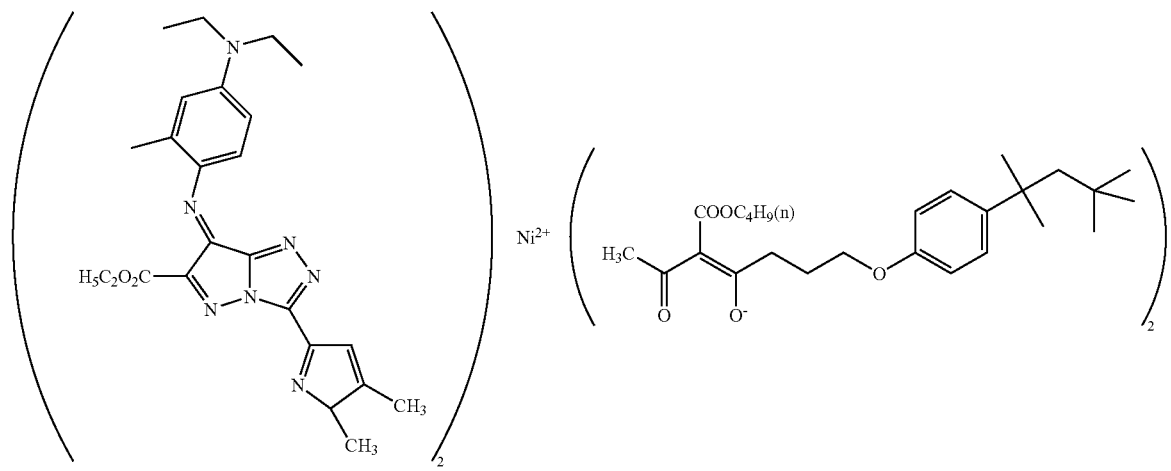
(C-11)
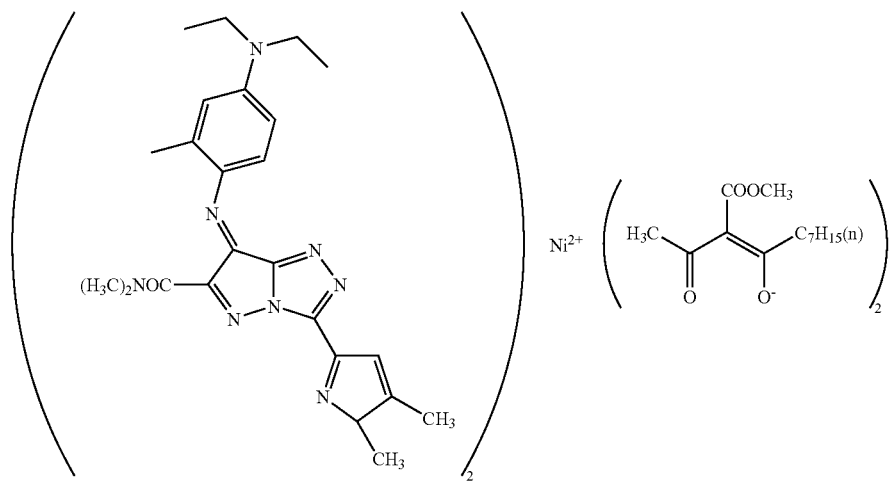
(C-12)
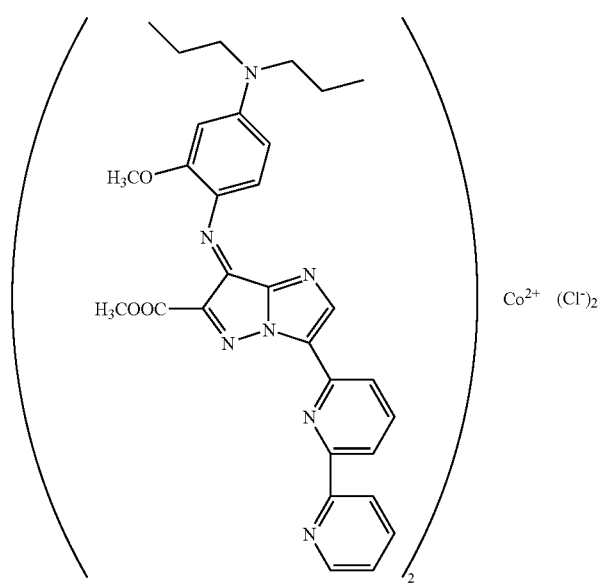
(C-13)

-continued
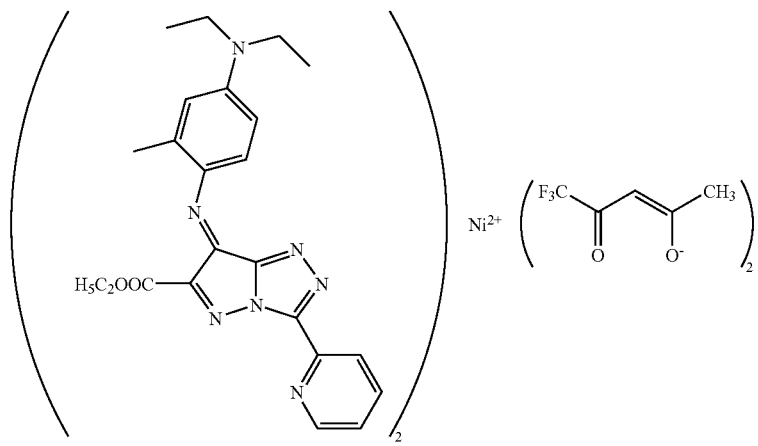
(C-14)
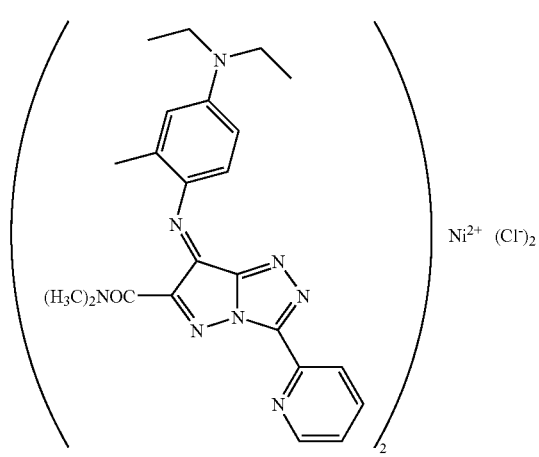
(C-15)
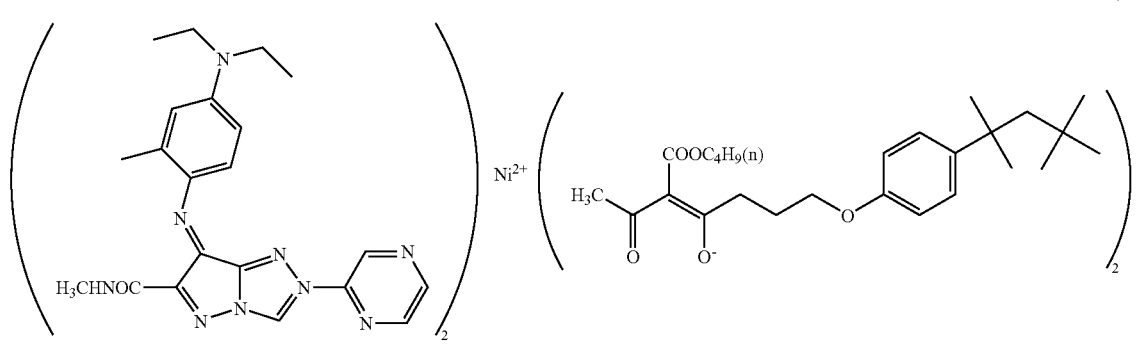
(C-16)
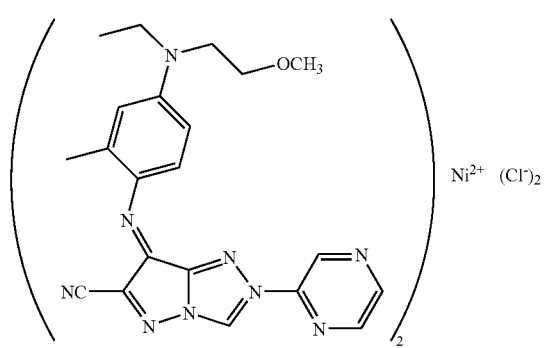
(C-17)

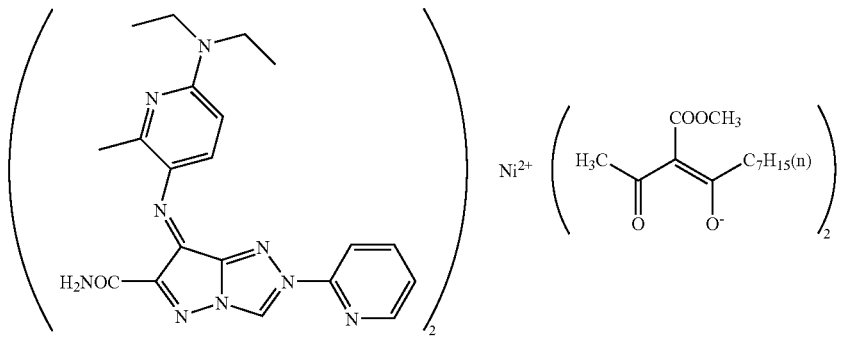
(C-18)
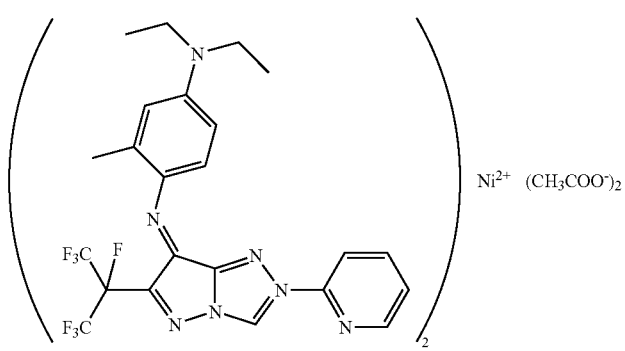
(C-19)
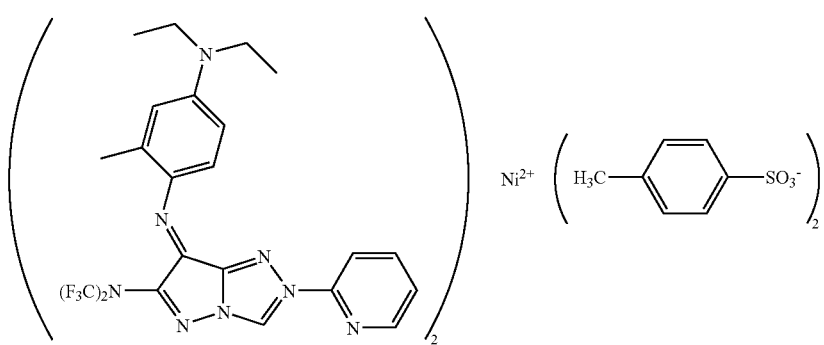
(C-20)
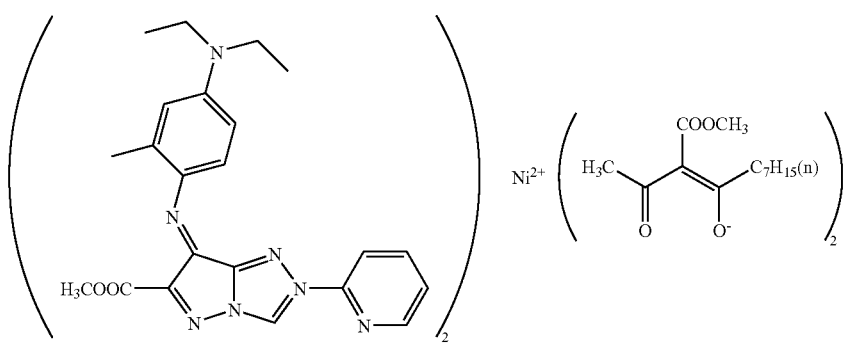
(C-21)

-continued
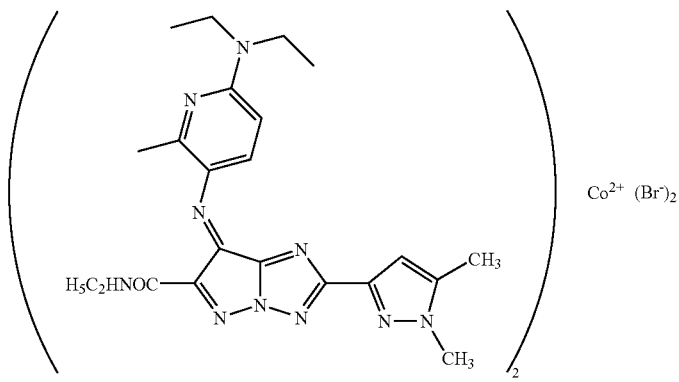
(C-22)
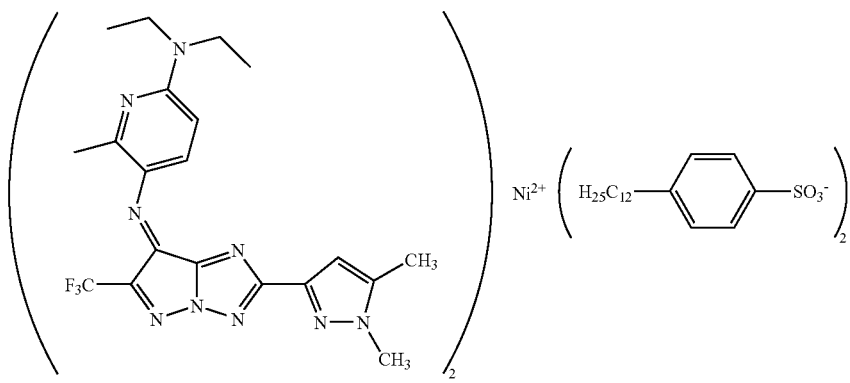
(C-23)
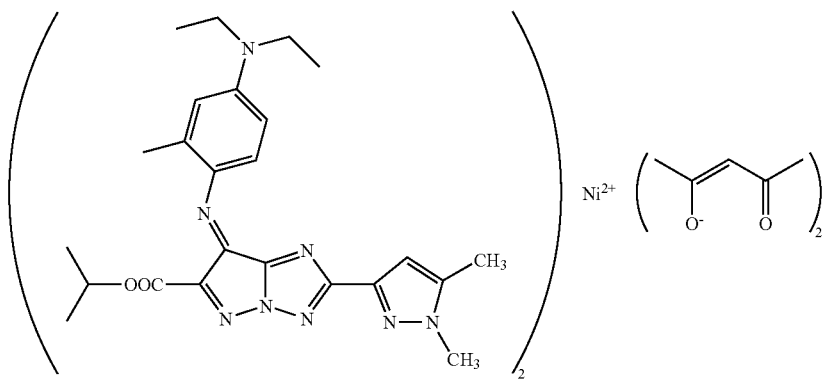
(C-24)
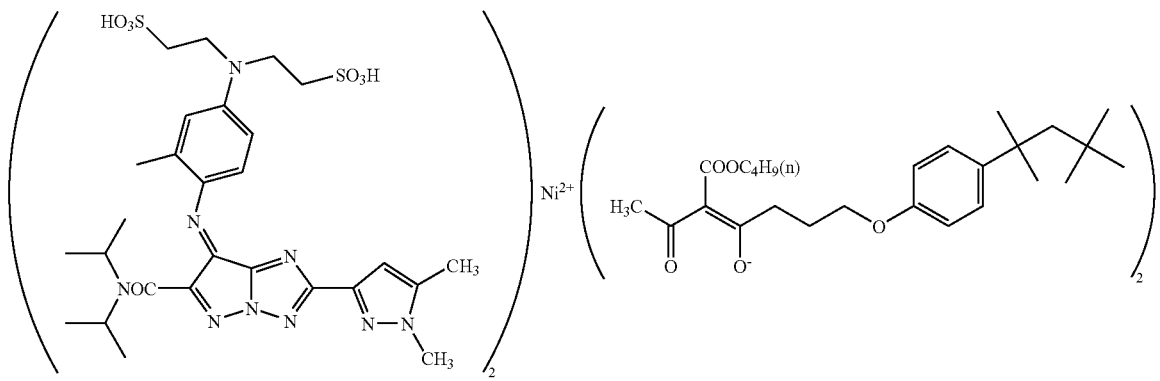
(C-25)

-continued
(C-26)
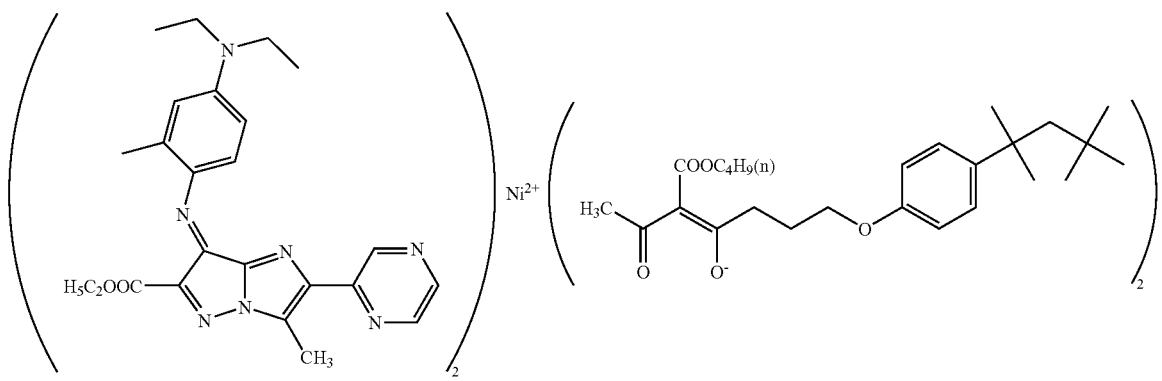
(C-27)
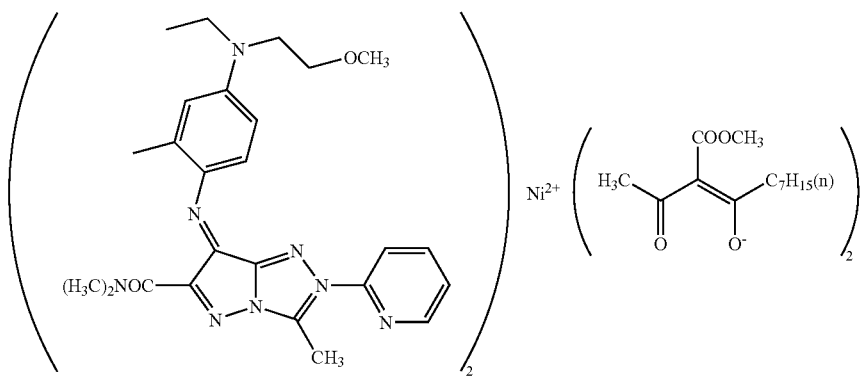
(C-28)
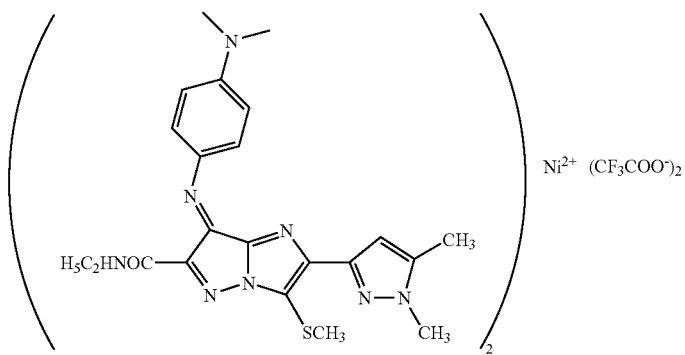
(C-29)
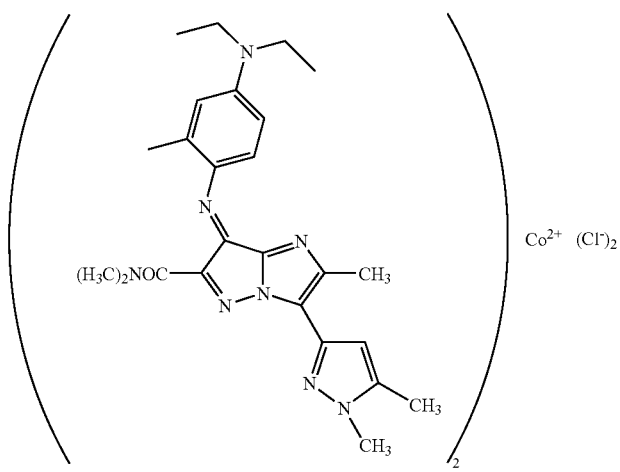

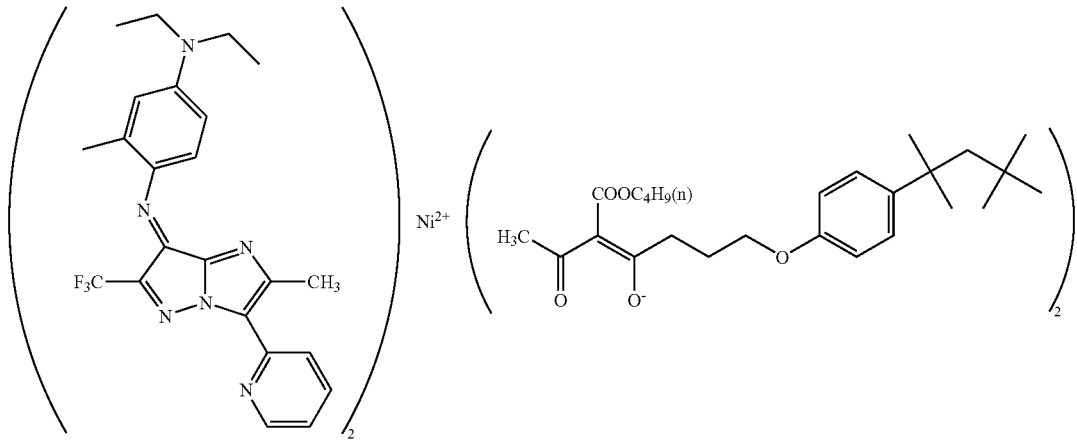
(C-30)
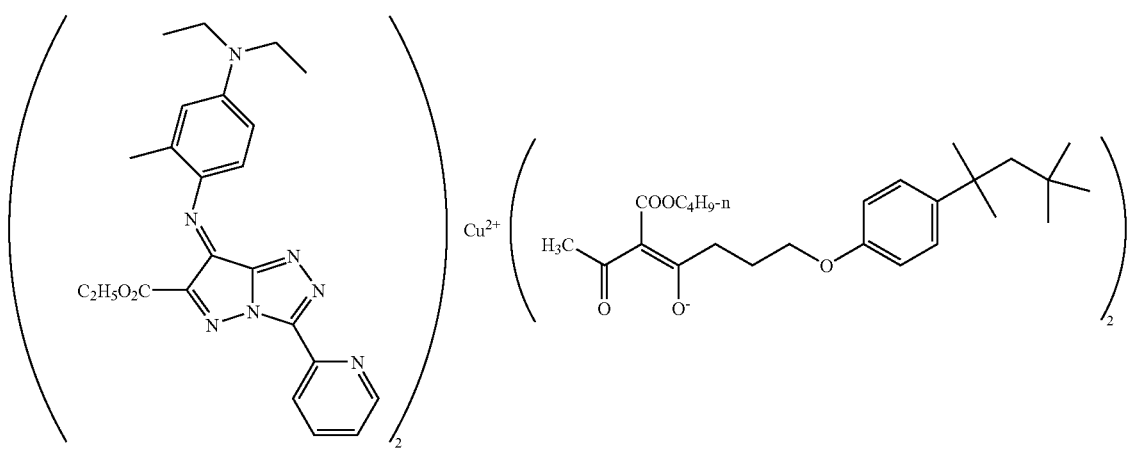
(C-31)
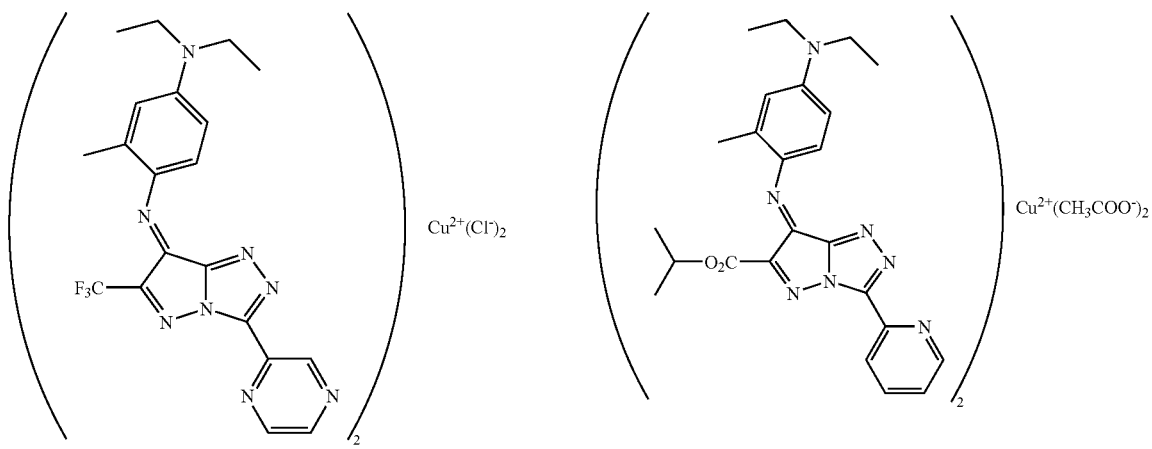
(C-32) (C-33)

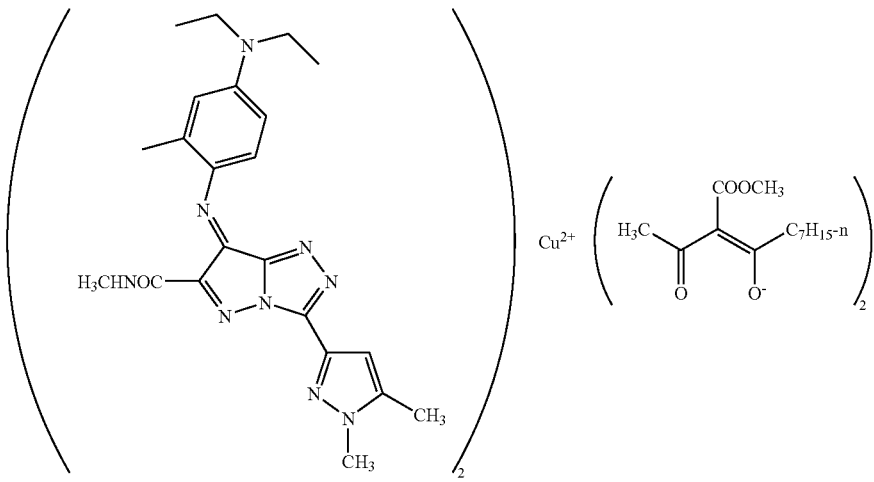

(C-34)

Metal ion containing compounds will now be described. Listed as metal ion containing compounds are inorganic or organic salts of metal ions as well as metal complexes. Of these, preferred are salts of organic acids and complexes. Selected as metals which constitute the above metal ion containing compounds are those from metal atoms of Groups VIII, Ib, IIb, IIIa, IVa, Va, VIa, and VIIa. Of these, preferred are bivalent transition metals. More preferably listed are bivalent metals including Ni, Cu, Co, Cr, Zn, Fe, Pd, and Pt, while most preferably listed are Ni, Cu, Co, Cr, and Zn. Specific examples capable of being preferably used include aliphatic acid salts of $Ni^{2+}$, $Cu^{2+}$, $Cr^{2+}$, $Co^{2+}$, and $Zn^+$ with fatty acids such as acetic acid or stearic acid, or salts of aromatic carboxylic acids such as benzoic acid or salicylic acid. Further, particularly preferably employed may be the complexes represented by the formula below:

$$[Me(Q_1)_l(Q_2)_m(Q_3)_n](Y^-)_p$$

In the above formula, Me represents a metal ion, preferably $Ni^{2+}$, $Cu^{2+}$, $Cr^{2+}$, $Co^{2+}$, and $Zn^{2+}$, and $Q_1$, $Q_2$, and $Q_3$ each represent a coordination compound capable of achieving a coordination bond with metal ions, which may be the same or different. These coordination compounds may be selected from those described, for example, in "Chelate Kagaku (Chelate Science) (5)" (Nanko Do). $Y^-$ represents an organic anionic group and specific examples include tetraphenyl borate anions and alkylbenzenesulfonate anions, while l, m, and n each independently represent an integer of 1–3, which is determined depending on a tetradentiate or a hexadentiate of the complex, while p represents 1 or 2.

Further preferably employed are the metal complexes represented by the following formula (in the case of l, m, and n=0):

$$Me^{2+}(Y^-)_2$$

In this formula, $Me^{2+}$ represents a bivalent transition metal ion, while $Y^-$ represents a coordination compound capable of forming a complex with a bivalent metal ion.

Employed as a binder resin for color toners of the present invention may be any of the binders which are commonly used. For example, listed are styrene based resins, acryl based resins, styrene/acryl based resins, and polyester resins.

To enhance fluidity and to control static charge, in the present invention, minute inorganic and organic particles may be externally added to color toners. Preferably employed are minute silica and titania particles which have been subjected to surface treatment employing alkyl group containing coupling agents. Incidentally, the number average primary particle diameter of these particles is preferably 10–500 nm, and the added amount to toners is preferably 0.1–20 percent by weight.

Employed as releasing agents may be any of the releasing agents which have been commonly used. Specifically listed are olefins such as low molecular weight polypropylene, low molecular weight polyethylene, or ethylene-propylene copolymers, as well as waxes such as microcrystalline wax, carnauba wax, sazole wax, or paraffin wax. The added amount of these in toners is preferably 1–5 percent by weight.

If desired, charge control agents may be added, and in view of color formation, those which are colorless are preferred. Listed as examples are those having a quaternary ammonium salt structure or a calixarene structure.

As a carrier, employed may be either a non-coated carrier which is composed only of magnetic material particles such as iron or ferrite, or a coated carrier in which the surface of magnetic material particles is covered with resins. The average particle diameter of the carrier is preferably 30–150 μm in terms of volume average particle diameter.

Image forming methods, into which the color toner of the present invention is applied, are not particularly limited. Examples include a method in which after repeatedly forming color images on a photoreceptor, the resulting images are transferred and a method in which images formed on a photoreceptor are successively transferred onto an intermediate transfer material, and after forming color images on the intermediate transfer material, color images are formed by transferring the resulting images onto an image forming media, such as a paper sheet.

It is possible to use ink-jet inks incorporating dyes of the present invention in various types of ink-jet recording liquids such as a water based liquid ink-jet recording composition, an oil-based liquid ink-jet recording composition, or a solid (phase change) liquid ink-jet composition.

In the water based liquid ink-jet recording composition, other than the dyes of the present invention, commonly employed as a solvent are water and water-soluble organic solvents. Examples of water-soluble organic solvents include alcohols (e.g., methanol, ethanol, propanol, isopropanol, butanol, isobutanol, secondary butanol, tertiary butanol, pentanol, hexanol, cyclohexanol, and benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), polyhydric alcohol ethers (e.g., ethylene glycol monomethyl ether, ethylene glycol monoethyl ether, ethylene glycol monobutyl ether, diethylene glycol monomethyl ether, diethylene glycol monomethyl ether, diethylene glycol monobutyl ether, propylene glycol monomethyl ether, propylene glycol monobutyl ether, ethylene glycol monomethyl ether acetate, triethylene glycol monomethyl ether, triethylene glycol monoethyl ether, ethylene glycol monophenyl ether, and propylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, and tatramethylpropylenediamine), amides (e.g., formamide, N,N-dimethylformamide, and N,N-dimethylacetamide), heterocycles (e.g., 2-pyrrolidone, N-methyl-2-pyrrolidone, cyclohexylpyrrolidone, 2-oxazolidone, and 1,3-dimethyl-2-imidazolidinone), sulfoxides (e.g., dimethylsulfoxide), sulfones (e.g., sulfolane), urea, acetonitrile, and acetone.

In the water based liquid ink-jet recording composition described above, dyes, when they are soluble in the solvent systems, may be dissolved without any modification and then used. On the other hand, when dyes are insoluble solids without any modification, the dyes of the present invention are modified into minute particles employing various types of homogenizers (for example, a ball mill, a sand mill, an attritor, a roller mill, an agitator mill, a Henschel mixer, a colloid mill, an ultrasonic homogenizer, a pearl mill, a jet mill and an ONGU-mill). Alternatively, after allowing dyes to dissolve in organic solvents, they are dispersed into such solvent systems together with polymer dispersing agents or surface active agents. In cases in which dyes are insoluble liquid or semi-fused materials, they are subjected to no modification or dissolved in organic solvents, and may be then dispersed into the solvent system together with polymer dispersing agents or surface active agents. In regard to specific preparation methods of such water based ink-jet recording liquid compositions, reference may be made, for example, to JP-A Nos. 5-148436, 5-295312, 7-97541, 7-82515, and 7-118584.

In oil based liquid ink-jet recording composition, other than the dyes of the present invention, organic solvents are employed as a solvent. Listed as solvents of such oil based liquid ink-jet recording compositions, in addition to those exemplified as water-soluble organic solvents, are alcohols (e.g., pentanol, heptanol, octanol, phenylethyl alcohol, phenylpropyl alcohol, furfuryl alcohol, and amyl alcohol), esters (e.g., ethylene glycol diacetate, ethylene glycol monomethyl ether acetate, diethylene glycol monomethyl ether, acetate, propylene glycol diacetate, ethyl acetate, amyl acetate, benzyl acetate, phenylethyl acetate, phenoxyethyl acetate, ethyl phenylacetate, benzyl propionate, ethyl benzoate, butyl benzoate, butyl lauriate, isopropyl myristiate, triethyl phosphate, tributyl phosphate, diethyl phthalate, dibutyl phthalate, diethyl malonate, dipropyl malonate, diethyl diethylmalonate, diethyl succinate, dibutyl succinate, diethyl glutarate, diethyl adipate, dipropyl adipate, dibutyl adipate, di(2-methoxyethyl) adipate, diethyl sebacate, diethyl maleate, dibutyl maleate, dioctyl maleate, diethyl fumarate, octyl fumarate, and cinnamic acid-3-hexenyl), ethers (e.g., butyl phenyl ether, benzyl ethyl ether, and hexyl ether), ketones (e.g., benzyl methyl ketone, benzyl acetone, diacetone alcohol, and cyclohexanone), hydrocarbons (e.g., petroleum ether, petroleum benzyl, tetralin, decalin, t-amylbenzene, and dimethylnaphthalene), and amides (e.g., N,N-diethyldodecane amide).

In oil based liquid ink-jet recording compositions, dyes may be dissolved without any modification and then employed. Alternatively, they may be dispersed or dissolved simultaneously employing resinous dispersing agents and binding agents.

In regard to specific preparation methods of such oil based liquid ink-jet recording compositions, reference may be made to JP-A Nos. 3-231975 and 5-508883.

In solid (phase change) liquid ink-jet recording compositions, other than the dyes of the present invention, may be employed as solvents phase change solvents which are solid at room temperature and in a fused liquid state during thermal ejection of the ink.

Listed as such phase change solvents are natural wax (e.g., beeswax, carnauba wax, rice wax, Japan tallow, jojoba oil, spermaceti, candelilla wax, lanolin, montan wax, ozokerite, ceresin, paraffin wax, microcrystalline wax, and petrolactum), polyethylene wax derivatives, chlorinated hydrocarbon, organic acids (e.g., palmitic acid, stearic acid, behenic acid, tiglic acid, 2-acetonaphthonebehenic acid, 12-hydroxystearic acid, and dihydroxystearic acid), organic acid esters (e.g., esters of the above organic acid with glycerin, diethylene glycol, and ethylene glycol), alcohols (e.g., dodecenol, tetradecanol, hexadecanol, eicosanol, docosanol, tetracosanol, hexacosanol, octacosanol, dodecenol, myrysil alcohol, tetracenol, hexadecanol, eicocenol, dococenol, pinene glycol, hinokitiol, butyndiol, nonandiol, isophthalyl alcohol, meciserin, terephthalic alcohol, hexanediol, decanediol, dodecanediol, tetradecanediol, hexadecanediol, docosanediol, tetracosanediol, terebineol, phenylglycerin, eicosanediol, octanediol, phenylpropylene glycol, bisphenol A, and para-alfa-cumylphenol), ketones (e.g., benzoylacetone, diacetobenzene, benzophenone, tricosane, heptacosane, heptatriacontanone, hentryacontanone, heptatriacontanone, stearone, laurone, and dianisole), amides (e.g., oleic acid amide, lauric acid amide, stearic acid amide, ricinoleic acid amide, palmitic acid amide, tetrahydrofuroic acid amide, erucic acid amide, myristic acid amide, 12-hydroxystearic acid amide, N-sterarylerucic acid amide, N-oleylstearic acid amide, N,N'-ethylenebislauric acid amide, N,N'-ethylenebisstearic acid amide, N,N'-ethylenebisoleic acid amide, N,N'-methylenebisstearic acid amide, N,N'-ethylenebisbehenic acid amide, N,N'-xylenebisstearic acid amide, N,N'-butylenebisstearic acid amide, N,N'-dioleyladipic acid amide, N,N'-distearyladipic acid amide, N,N'-dioleysebacic acid amide, N,N'-cissearylsebacic acid amide, N,N'-distearylphthalic acid amide, N,N'- distearylisophthalic acid amide, phenacetin, toluamide, acetamide, reaction product tetraamides of dimer acid with diamine, such as oleic acid dimer/ethylenediamine/stearic acid (at a mol ratio of 1:2:2), sulfonamide (e.g., para-toluenesulfonamide, ethylbenzenesulfoneamide, and butyl-benzenesulfonamide), silicones (e.g., SILICONE SH6018, (available from Toray Silicone Co.), and SILICONE KR2, 15, 216, and 220 (available from Shin-Etu Silicone Co.), cumarones (e.g., ESCURON G-90 (available from Nippon Steel Chemical Co., Ltd.), cholesterol fatty acid esters (e.g., stearic acid cholesterol, palmitic acid cholesterol, myristic acid cholesterol, behenic acid cholesterol, lauric acid cholesterol, and melissic acid cholesterol), saccharide fatty acid esters (e.g., stearic acid saccharose, palmitic acid saccharose, behenic acid saccharose, lauric acid saccharose, melissic acid saccharose, stearic acid lactose, palmitic acid lactose, myristic acid lactose, behenic acid lactose, lauric acid lactose, and melissic acid lactose).

The phase change temperature of the solid-liquid phase change of solid inks is preferably at least 60° C., but is more preferable 80–150° C.

In the above solid ink-jet recording liquid compositions, the dyes of the present invention may be dissolved in heated solvents in a fused state without any modification and then employed. Alternatively, the dyes may be dispersed or dissolved together with resinous dispersing agents and binders and then employed.

In regard to specific preparation methods of such solid ink-jet liquid recording compositions, reference may be made to JP-A Nos. 5-186723 and 7-70490.

The viscosity of each of the water based, oil based and solid ink-jet liquid recording compositions is preferably at most $4 \times 10^{-2}$ Pa·s but is more preferably at most $3 \times 10^{-2}$ Pa·s during ejection.

The surface tension of the ink-jet inks of the present invention is preferably at least $2 \times 10^{-4}$ N/cm, but is more preferably $3 \times 10^{-4}$–$80 \times 10^{-4}$ N/cm during ejection.

The used amount of the dyes of the present invention is preferably in the range of 0.1–25 percent by weight with respect to the total ink, but is more preferably in the range of 0.5–10 percent by weight.

Added to the ink-jet inks of the present invention may be viscosity modifiers, surface tension controlling agents, resistivity controlling agents, film forming agents, dispersion agents, surface active agents, ultraviolet radiation absorbing agents, antioxidants, anti-discoloring agents, antifungal agents, and rust preventives, corresponding to the purposes to enhance various types of performance such as ejection stability, adaptation of print heads and ink cartridges, storage stability, and image retention properties.

Recording systems, which are employed for the ink-jet inks of the present invention, are not particularly limited. However, they may be particularly and preferably employed as an ink for ink-jet printers utilizing on-demand systems. Listed as specific examples of on-demand type systems may be an electric-mechanical conversion system (for example, a single cavity type, a double cavity type, a vendor type, a piston type, a shared mode type, and a shared wall type), an electric-thermal conversion system (for example, a thermal ink-jet type and BUBBLE JET (being a registered trade name), an electrostatic suction system (for example, an electric field controlling type and a slit jet type), an electric discharge system (for example, a spark jet type).

EXAMPLES

The present invention will now be described with reference to examples, however the present invention is not limited thereto.

Example 1

(Synthesis of Exemplified Compounds 5)

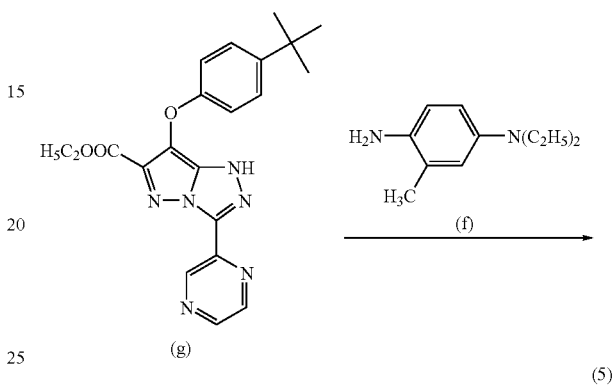

Into 20 ml of ethanol suspended, was 1.3 g (0.00295 mol) of (g), and 2.4 g (0.0236 mol) of triethylamine was dripped into the resulting suspension followed by the addition of 0.95 g (0.00442 mol) of (f) in the form of a powder. While cooled by water, gradually dripped was an aqueous solution, prepared by dissolving 2 g (0.00885 mol) of ammonium persulfate in 6 ml of water. After dripping, water-cooling was terminated and agitation was continued for an additional 30 minutes. After the completion of the reaction, deposits were collected by filtration and washed with water, and the resulting crude crystals were recrystallized employing ethanol, whereby 0.97 g (at a yield of 76 percent) of (5) was obtained. The structure was identified based on the NMR and mass spectra.

(Synthesis of Exemplified Compound 14)

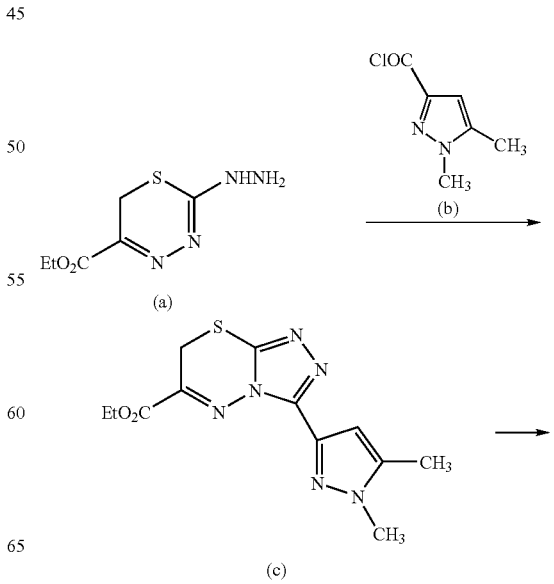

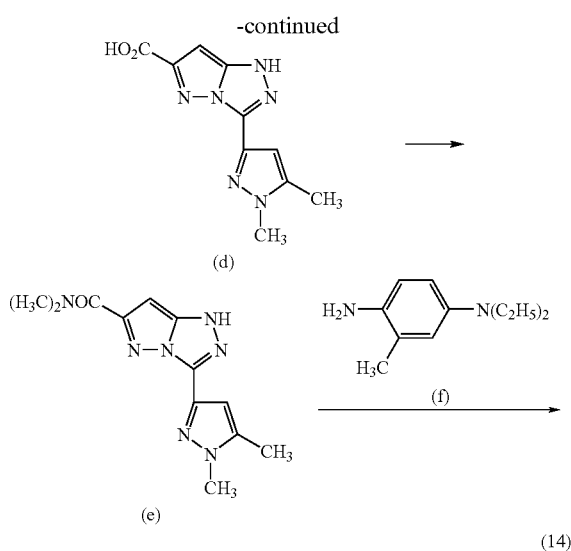

While stirring, 150 ml of acetonitrile was poured into a beaker, to which 30 g (0.148 mol) of (a) was placed, to result in a suspension. Subsequently, 24.7 g (0.155 mol) of (b) was dripped into the resulting suspension. After dripping, the resulting mixture was allowed to react for 3 hours while refluxed under heating. After completion of the reaction, 150 ml of ethyl acetate and 150 ml of water were added, followed by extraction. After adjusting the pH of the water layer to neutral by the addition of an aqueous sodium hydrogencarbonate solution, the solvents in the organic layer was distilled out under reduced pressure. The residue was subjected to separation employing column chromatography in which ethyl acetate was used as a development solvent. The solvent was then distilled out, whereby 21.3 g (at a yield of 47 percent) of yellow amorphous (c) was obtained.

Dissolved in 20 ml of acetic anhydride was 10 g (0.03264 mol) of (c). While stirring, the resulting mixture was refluxed for two hours under heat. After natural cooling, the solvent was distilled out under reduced pressure, and the residue was dissolved in 30 ml of acetic acid. Subsequently added were 5.3 g (0.06528 mol) of phosphorous acid and 1.62 g (0.00979 mol) of potassium iodide, and the resulting mixture was heated to an interior temperature of 100° C. Thereafter, 15 g of an aqueous hydrobromic acid solution (40 percent) was added via dripping. The resulting mixture was refluxed for four hours under heat. During refluxing, crystals were deposited. After the reaction, heating was terminated and the deposits were collected by filtration while naturally cooled. The collected deposits were subjected to suspension washing and dried, whereby 7.5 g (at a yield of 93.7 percent) of (d) wad obtained.

Added to 7.0 g (0.0284 mol) of (d) was 35 ml of acetonitrile, and the resulting mixture was stirred at a suspension state. Subsequently added was 2.3 g of pyridine, followed by gradual addition of 3.8 g of acetic anhydride to the resulting mixture while maintained at 65° C. Thereafter, while stirring, refluxing was performed for four hours under heat. After reaction, the resulting crystals were naturally cooled and collected by filtration. The collected crystals were washed with acetonitrile and dried. The resulting crystals were suspended in 20 ml of toluene and 0.5 ml of DMF, followed by dripping of 7.1 g (0.0596 mol) of thionyl.

After that dripping, the resulting mixture was heated, refluxed, and stirred for 2.5 hours. During the operation, the added compounds were completely dissolved. After the reaction, the solvents were distilled out under reduced pressure. Added to the residue was 20 ml of ethyl acetate, and during forming a suspension while stirred, 3.3 g (0.0289 mol) of an aqueous 40 percent dimethylamine solution was dripped at a maximum of 45° C. Thereafter, an aqueous solution, prepared by dissolving 2.9 g (0.0213 mol) of potassium carbonate in 5 ml of water, was dripped at 15° C. or higher. After the dripping, the resulting mixture was stirred for one hour at room temperature. Thereafter, while stirred and heated, reaction was performed for 1.5 hours under refluxing. After reaction, the reaction product was naturally cooled and added with 5 ml of water. Subsequently, added to the resulting mixture was 3.3 g (0.0568 mol) of 20 percent ammonia water, and agitation was performed at 30° C. for two hours. After reaction, the resulting deposits were collected by filtration, washed with water and recrystallized employing acetonitrile. Thereafter, filtration and drying were performed, whereby 5.0 g (at a yield of 65 percent) of (e) was obtained.

Dissolved in 10 ml of methanol was 0.64 g (0.00234 mol) of (e), and subsequently, 1.9 g (0.0188 mol) of triethylamine was added. While cooled by water, 0.55 g (0.257 mol) of (f) as a powder was added without any treatment, and an aqueous solution prepared by dissolving 0.83 g (0.00348 mol) of sodium persulfate in 1.5 ml of water was gradually dripped. After the dripping, the temperature was allowed to return to room temperature and stirring was performed for 30 minutes. The liquid reaction composition was charged into iced water and stirred for a short time, thereafter, filtration and washing were performed. The resulting crude crystals were recrystallized employing methanol, whereby 0.82 g (at a yield of 78 percent) of (14) was obtained. The structure was identified based on NMR and mass spectra.

Example 2

Table 1 lists the azomethine dyes and metal complex dyes of the present invention, as well as the absorption maximums and molar absorption coefficients in acetone of Comparative Compound 1 (the values of the metal complex dyes were obtained as a value per dye molecule).

TABLE 1

| Exemplified Compound | Absorption Maximum | Molar Absorption Coefficient |
|---|---|---|
| 5 | 605 nm | 88000 |
| 10 | 597 nm | 82000 |
| 11 | 596 nm | 76000 |
| 14 | 577 nm | 79000 |
| 21 | 607 nm | 88000 |
| C-1 | 621 nm | 110000 |
| C-12 | 601 nm | 79000 |
| C-14 | 619 nm | 100000 |
| C-30 | 617 nm | 115000 |
| C-33 | 619 nm | 125000 |
| Comparative Compound 1 | 543 nm | 62000 |

TABLE 1-continued

| Exemplified Compound | Absorption Maximum | Molar Absorption Coefficient |
|---|---|---|

Comparative Compound 1

[Structure of Comparative Compound 1 with H3C, N-ethyl, methoxyethyl, F3C, pyrazolotriazole, and chlorophenyl groups]

D-15, Described in JP-A No. 10-264541

The azomethine dyes and metal complex dyes of the present invention exhibit sharper absorption and a higher molar absorption coefficient.

Example 3

A liquid coating composition, which was prepared by blending the following compounds, was applied onto a 150 μm thick synthetic paper sheet (trade name: YUPO FPG-150, produced by Oji Yuka Co., Ltd.) to result in a wet layer thickness of 65 μl and subsequently dried, whereby a sample coated with a layer containing the metal complex dye of the present invention was prepared. A comparative sample was prepared in the same manner as above, except that the metal complex dye was replaced with the comparative dye.

(Composition of Liquid Coating Composition)

| | |
|---|---|
| Metal complex dye of the present invention, Comparative Compounds 3 and 4 (listed in Table 2) | 100 mg |
| Polyvinyl butyral resin (S-LEC BX-1, produced by Sekisui Chemical Industry Co., Ltd.) | 4.0 g |
| Methyl ethyl ketone | 25 g |
| Tetrahydrofuran | 25 g |

The samples according to the present invention and comparative samples were compared based on the following methods, and fastness (lightfastness, heat resistance and moisture resistance) of the metal complex dyes and Comparative Compounds 3 and 4 was evaluated. Table 2 shows the results.

(Lightfastness)

The resulting dye images were irradiated for 72 hours, employing a xenon fade meter, and lightfastness was evaluated based on the dye residual ratio (in percent), represented by $(D_1/D_0) \times 100$, wherein $D_0$ represents density prior to light irradiation and $D_1$ represents density after light irradiation.

(Heat Resistance)

The resulting dye images were stored at 77° C. and a maximum of 10 percent relative humidity for 7 days. Heat resistance was evaluated based on the dye residual ratio (in percent), represented by $(D_2/D_0)$ wherein $D_0$ represents density prior to storage and $D_2$ represents density after storage.

(Moisture Resistance)

The resulting dye images were stored at 40° C. and 80 percent relative humidity for 7 days and moisture resistance was evaluated based on the dye residual ratio (in percent), represented by $(D_3/D_0)$ wherein $D_0$ represents density prior to storage and $D_3$ represents density after storage.

TABLE 2

| Exemplified Compound | Lightfastness | Heat Resistance | Moisture Resistance |
|---|---|---|---|
| C-1 | 97 | 99 | 100 |
| C-12 | 96 | 99 | 99 |
| C-14 | 94 | 99 | 100 |
| C-30 | 98 | 100 | 98 |
| C-22 | 93 | 95 | 96 |
| C-29 | 91 | 94 | 97 |
| Comparative Compound 3 | 97 | 98 | 45 |
| Comparative Compound 4 | 61 | 98 | 96 |

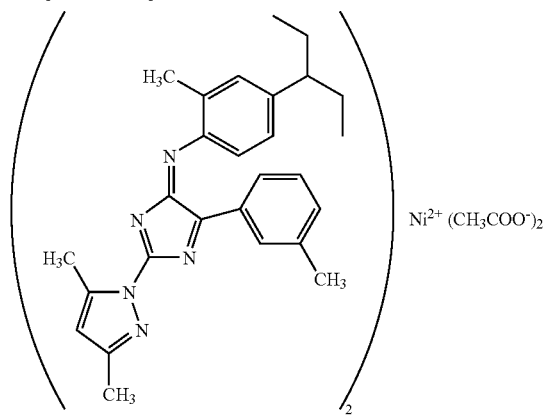

Comparative Compound 3

Comparative Compound 4

As can clearly be seen from Table 2, the metal complex dyes of the present invention exhibit excellent image fastness such as lightfastness, heat resistance and moisture resistance.

Example 4

<Production of Color Toner: Pulverization Method>

Powder at an average particle diameter of 8.5 μm was obtained by blending 100 parts of polyester resins, 8 parts of the compound listed in Table 3, and 3 parts of polypropylene, and kneading, pulverizing and classifying the resulting mixture. Further, 100 parts of the resulting powder and 1.0 part of minute silica particles (at a particle diameter of 12 nm and hydrophobicity of 60) were blended employing a Henschel mixer, whereby a color toner was obtained.

<Production of Color Toner: Polymerization Method>

Added to an aqueous solution prepared by dissolving 5 g of sodium dodecylsulfate in 200 ml of pure water was 20 g of the compound listed in Table 3. Previously, an emulsion dispersion was prepared in such a manner that upon providing stirring and ultrasonic waves, a water based colorant dispersion and low molecular weight polypropylene (at an average molecular weight of 3,200) were emulsified in water, employing surface active agents, while heated to achieve a solid concentration of 30 percent by weight.

The above colorant dispersion was blended with 60 g of lower molecular weight polypropylene emulsion dispersion. Further added to the resulting mixture were 220 g of styrene monomer, 40 g of n-butyl acrylate monomer, 12 g of methacrylic acid monomer, 5.4 g of dodecylmercaptan as a chain transfer agent, and 2,000 ml of pure degassed water. Thereafter, while stirring under a flow of nitrogen, the resulting mixture was maintained at 70° C. for three hours to undergo emulsion polymerization.

The pH of the resulting colorant containing minute resinous particle dispersion in an amount of 1,000 ml was adjusted to 7.0 by the addition of sodium hydroxide. Thereafter, added were 270 ml of a 2.7 mol percent aqueous potassium chloride solution, 160 ml of isopropyl alcohol, and 9.0 g of polyoxyethylene octyl phenyl ether at an ethylene oxide average degree of polymerization of 10, which was dissolved in 67 ml of pure water, and while stirring, the resulting mixture underwent reaction at 75° C. for 6 hours.

The resulting liquid reaction product was filtered, washed with water, further dried, and pulverized, whereby colored particles were obtained. Subsequently, the resulting colored particles and minute silica partixcles (at a particle diameter of 12 nm and a hydrophobicity of 60) were blended employing a Henschel mixer, whereby a colored toner was obtained.

A developer was prepared by uniformly blending 10 parts of the above toner and 900 parts of carrier iron powder (under the trade name of EFV250/400, produced by Nippon Iron Powder Co.). Samples were prepared in the same manner as above, except for adding 3 parts by weight of the compound listed in Table 3. Copying was performed employing a plain paper electrophotographic copier (under the trade name of NP-5000, produced by Canon Inc.) loaded with each of the above developers.

Evaluation tests were performed as follows. Based on the above image forming method, reflection images (images on paper sheets) as well as transmission images (OHP images) were formed on paper and OHP film, respectively, employing the developers composed of the above color toners. Subsequently, tests were performed based on the following methods. Incidentally, evaluation was performed in the range of an adhered toner amount of 0.7±0.05 mg/cm².

Hue and lightfastness of the resulting images, as well as transparency of OHP images, were evaluated.

The hue was visually evaluated in three grades, i.e., excellent, good, and poor. The table below shows the evaluation results. In Table 3, "A" means that hue was excellent, B means that hue was good, and C means that hue was poor.

Lightfastness was evaluated as follows. After determining image density Ci immediately after recording, images were irradiated with xenon radiation (85,000 lux) for 5 days, employing a weather meter (ATLAS C.165). Resulting image density Cf was then determined, and residual dye ratio ($\{(Ci-Cf)/Ci\}\times 100$ percent) was calculated for evaluation of lightfastness. Image density was determined employing a reflection densitometer (X-RITE 310TR). Table 3 shows the evaluation results. In Table 3, "A" means that the residual dye ratio was at least 90 percent, B means that the same was 80–89 percent, and C means that the same was less than 80 percent.

The transparency of OHP images was evaluated employing the following method. On an OHP sheet carrying no image as a reference, the spectral transmittance in the visible wavelength range of images was determined employing "330 TYPE AUTOMATIC SPECTROPHOTOMETER", produced by Hitachi, Ltd. and a transmittance value at a wavelength of 650 nm was obtained and used as a standard for the scale of the transparency of OHP images. "A" means that the spectral transmittance was at least 80 percent, B means that the same was 70–79 percent, and C means that the same was less than 70 percent. Table 3 shows the results.

TABLE 3

| Color Toner | Exemplified Compound | Hue | Light-fastness | Transparency | Production Method |
|---|---|---|---|---|---|
| 1 | 5 | A | A | A | Pulverization Method |
| 2 | 10 | A | A | A | Polymerization Method |
| 3 | 11 | A | A | A | Polymerization Method |
| 4 | 14 | A | A | A | Polymerization Method |
| 5 | 21 | A | A | A | Polymerization Method |
| 6 | 37 | A | A | A | Pulverization Method |
| 7 | 50 | A | A | A | Pulverization Method |
| 8 | C-1 | A | A | A | Polymerization Method |
| 9 | C-7 | A | A | A | Polymerization Method |
| 10 | C-11 | A | A | A | Pulverization Method |
| 11 | C-21 | A | A | A | Pulverization Method |
| 12 | C-26 | A | A | A | Polymerization Method |
| 13 | C-30 | A | A | A | Polymerization Method |
| 14 | C-33 | A | A | A | Polymerization Method |
| 15 | Comparative Compound 5 | B | C | A | Polymerization Method |
| 16 | Comparative Compound 6 | B | B | B | Pulverization Method |

TABLE 3-continued

| Color Toner | Exemplified Compound | Hue | Light-fastness | Trans-parency | Production Method |
|---|---|---|---|---|---|
| 17 | C.I. Pigment Red122 | C | A | C | Polymerization Method |

Comparative Compound 5 (Example 3 of JP-A No. 6-59509)

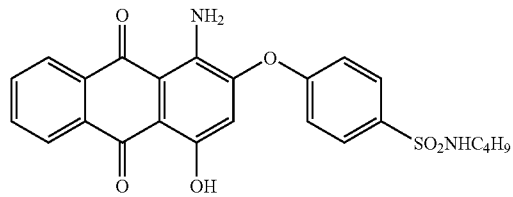

Comparative Compound 6 (Example 6 of JP-A No. 6-148939)

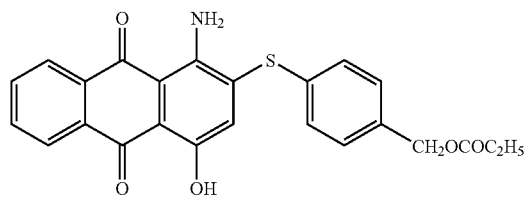

As can clearly be seen from Table 3, since the use of color toners of the present invention realizes faithful color reproduction as well as high OHP quality, the color toners of the present invention are suitably employed as a full color toner. Further, since excellent lightfastness is realized, it is possible to provide images which can be stored over an extended period of time without discoloration.

Example 5

Ink Composition I-2 was prepared in the same manner as I-1, except that a metal complex dye (C-1) was employed to prepare Ink Composition I-1, composed as described below according to the conventional method, and Phthalocyanine Compound C, descried below, was used as a cyan dye.

(Composition of Ink Composition I-1)

| | |
|---|---|
| Metal complex dye (C-1) | 1.4 percent by weight |
| Diethylene glycol | 19 percent by weight |
| Triethylene glycol monobutyl ether | 9 percent by weight |
| Surface active agent SURFYNOL 465 (produced by Air Products and Chemicals, Inc.) | 0.6 percent by weight |
| Ion-exchange water | 70 percent by weight |

SURFYNOL 465

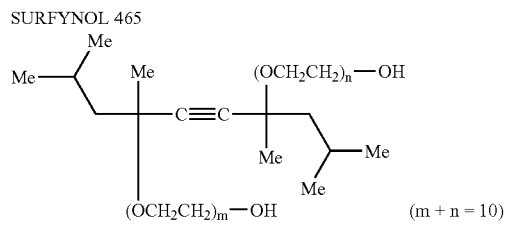

Copper Phthalocyanine Compound C

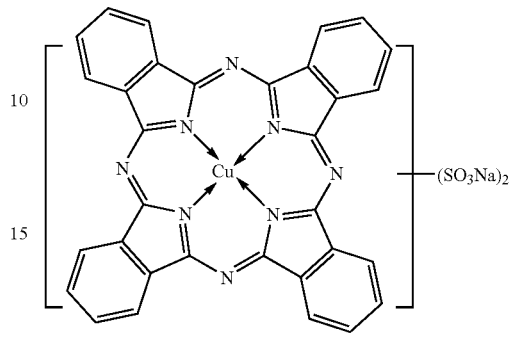

Samples were prepared in such a manner that recording was performed on special ink-jet sheets (PM PHOTOGRAPHIC SHEET, produced by Seiko Epson Corp.), employing INK-JET PRINTER PM800C (produced by Seiko-Epson Corp.) loaded with each of Ink Compositions I-1 and I-2 prepared as above. The resulting color tone was visually evaluated. The prepared sample employing Ink Composition I-1 incorporating the metal complex dye of the present invention exhibited bright cyan, while the prepared sample employing Ink Composition I-2 exhibited unsaturated color and color tone which was near blue.

In cases in which as media to be recorded, PM PHOTOGRAPHIC SHEET was replace with QP PAPER (produced by Konica Minolta Corp.), similar results were obtained. Further, employed were Ink Compositions I-3, I-4, I-5, I-6, and I-7 prepared by replacing metal complex dye (C-1) with each of metal complex dyes (C-11), (C-14), (C-15), (C-21), and (C-30), as well as Ink Composition I-8 which was prepared employing, instead of the metal complex dye, in such a manner that Azomethine Dye 21 and the metal ion containing compound described below were mixed in acetone at a ratio of 1:5 and then concentrated and samples were prepared in such a manner that in the same manner as for Ink Compositions I-1 and I-2, recording was performed on recording sheets employing an ink-jet printer. The color tone of the resulting samples was visually evaluated, and similar results were obtained.

As noted above, by employing the ink-jet ink using the metal complex dyes of the present invention, it is possible to obtain recorded images which exhibit excellent color tone.

Metal ion containing compound

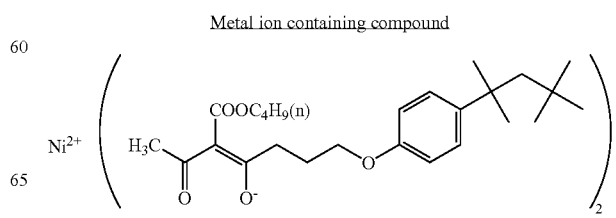

What is claimed is:

1. An azomethine dye represented by the following Formula 2:

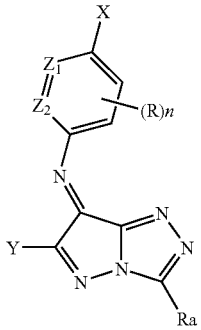

Formula 2 wherein Y represents a substituent of $0.4 \leq \sigma p \leq 0.7$, $Z_1$ and $Z_2$ each represent $-CR_1=$ or $-N=$ where $R_1$ represents a hydrogen atom or a substituent, X represents an unsubstituted or substituted di-alkylamino group, R represents an unsubstituted or substituted alkyl group, n represents an integer more than 0, $R_a$ represents the group represented by the Formula 1a:

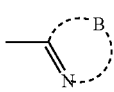

Formula 1a wherein B represents a group of non-metallic atoms which are necessary to form a heterocyclic ring.

2. An azomethine dye represented by the following Formula 3:

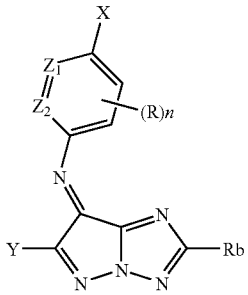

Formula 3 wherein Y represents a substituent of $0.4 \leq \sigma p \leq 0.7$, $Z_1$ and $Z_2$ each represent $-CR_1=$ or $-N=$ where $R_1$ represents a hydrogen atom or a substituent, X represents an unsubstituted or substituted di-alkylamino group, R represents an unsubstituted or substituted alkyl group, n represents an integer more than 0, $R_b$ represents the group represented by the Formula 1a:

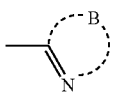

Formula 1a wherein B represents a group of non-metallic atoms which are necessary to form a heterocyclic ring.

3. A metal complex dye represented by the following Formula 5:

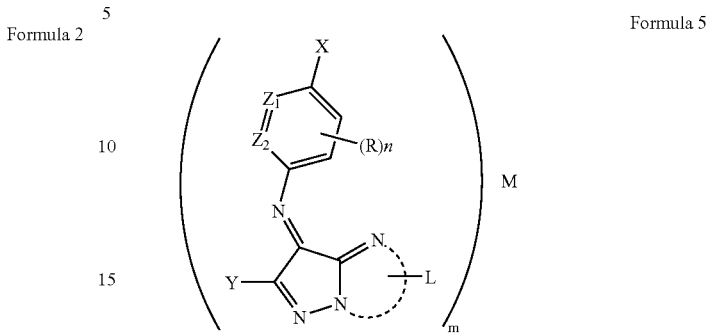

Formula 5 wherein Y represents a substituent of $0.4 \leq \sigma p \leq 0.7$, $Z_1$ and $Z_2$ each represent $-CR_1=$, where $R_1$ represents a hydrogen atom or a substituent, or $-N=$, L represents the group represented by the Formula 1a, X represents an unsubstituted or substituted di-alkylamino group, R represents an unsubstituted or substituted alkyl group, M represents a metal atom or the salt thereof, n represents an integer more than 0, and m represents an integer,

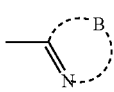

Formula 1a wherein B represents a group of non-metallic atoms which are necessary to form a heterocyclic ring.

4. The metal complex dye of claim 3 represented by the Formula 5, wherein Y is a group selected from an acyl group, an alkoxycarbonyl group, an aryloxycarbonyl group, an alkylsulfonyl group, an arylsulfonyl group, a sulfamoyl group, a cyano group, or a perfluoroalkyl group.

5. The metal complex dye of claim 3 represented by the Formula 5, wherein L represents the group represented by the Formulas 1b and 1c:

Formula 1b

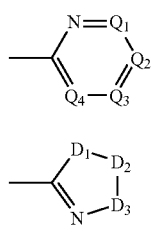

Formula 1c wherein $Q_1$–$Q_4$ each represent $-CR_{3a}=$ or $-N=$, $D_1$–$D_3$ each represent $-CR_{3b}$ or $-N=$, and $R_{3a}$ and $R_{3b}$ each represent a substituent.

6. The metal complex dye of claim 3 represented by the Formula 5, wherein $Z_2$ represents $-CR_1=$ (where $R_1$ represents a hydrogen atom or a substituent).

7. The metal complex dye of claim 3 represented by the Formula 5, wherein M is a metal atom selected from the group consisting of Ni, Cu, Co, Cr, Zn, Fe, Pd, and Pt, or the salt thereof.

8. The metal complex dye of claim 3 further represented by the following Formula 6:

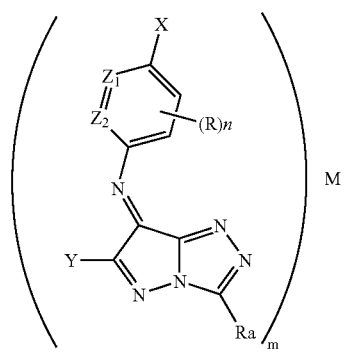

Formula 6 wherein Y represents a substituent of $0.4 \leq \sigma p \leq 0.7$, $Z_1$ and $Z_2$ each represent $-CR_1=$, where $R_1$ represents a hydrogen atom or a substituent, or $-N=$, X represents an unsubstituted or substituted di-alkylamino group, R represents an unsubstituted or substituted alkyl group, M represents a metal atom or a salt thereof, n represents an integer more than 0, $R_a$ represents the group represented by the Formula 1a, and m represents an integer,

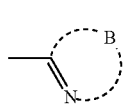

Formula 1a wherein B represents a group of non-metallic atoms which are necessary to form a heterocyclic ring.

9. The metal complex dye of claim 3 further represented by the following Formula 7:

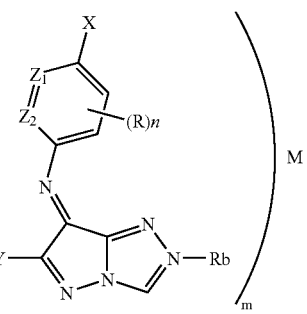

Formula 7 wherein Y represents a substituent $0.4 \leq \sigma p \leq 0.7$, $Z_1$ and $Z_2$ each represent $-CR_1=$, where $R_1$ represents a hydrogen atom or a substituent, or $-N=$, X represents an unsubstituted or substituted di-alkylamino group, R represents an unsubstituted or substituted alkyl group, N represents a metal atom or a salt thereof, n represents an integer more than 0, $R_b$ represents the group represented by the Formula 1a, and m represents an integer,

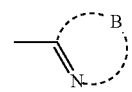

Formula 1a wherein B represents a group of non-metallic atoms which are necessary to form a heterocyclic ring.

10. The metal complex dye of claim 8 represented by the Formula 6, wherein M is a metal atom selected from the group consisting of Ni, Cu, Co, Cr, Zn, Fe, Pd, and Pt, or the salt thereof.

11. The metal complex dye of claim 9 represented by the Formula 7, wherein M is a metal atom selected from the group consisting of Ni, Cu, Co, Cr, Zn, Fe, Pd, and Pt, or the salt thereof.

12. A color toner comprising a metal complex dye represented by the Formula 5 of claim 3.

13. An ink-jet ink comprising a metal complex dye represented by the Formula 5 of claim 3.

* * * * *